(12) United States Patent
Salisbury et al.

(10) Patent No.: US 11,370,129 B2
(45) Date of Patent: Jun. 28, 2022

(54) VACUUM GENERATING DEVICE FOR ROBOTIC HARVESTING

(71) Applicant: Abundant Robotics, Inc., Hayward, CA (US)

(72) Inventors: Curt Salisbury, San Ramon, CA (US); Daniel C. Steere, Atherton, CA (US); Michael Eriksen, San Francisco, CA (US); Cedric Schwab, San Francisco, CA (US)

(73) Assignee: Abundant Robots, Inc., Santa Monica, CA (US)

( * ) Notice: Subject to any disclaimer, the term of this patent is extended or adjusted under 35 U.S.C. 154(b) by 517 days.

(21) Appl. No.: 16/332,563

(22) PCT Filed: Sep. 20, 2017

(86) PCT No.: PCT/US2017/052404
§ 371 (c)(1),
(2) Date: Mar. 12, 2019

(87) PCT Pub. No.: WO2018/057562
PCT Pub. Date: Mar. 29, 2018

(65) Prior Publication Data
US 2021/0323174 A1    Oct. 21, 2021

Related U.S. Application Data

(60) Provisional application No. 62/397,456, filed on Sep. 21, 2016.

(51) Int. Cl.
*B25J 15/06* (2006.01)
*A01D 46/22* (2006.01)
(Continued)

(52) U.S. Cl.
CPC .......... *B25J 15/0658* (2013.01); *A01D 46/22* (2013.01); *A01D 46/24* (2013.01); *A01D 46/30* (2013.01);
(Continued)

(58) Field of Classification Search
CPC ........ A01D 46/22; A01D 46/24; A01D 46/30; B25J 15/0658; B25J 9/1679; B25J 11/0045
See application file for complete search history.

(56) References Cited

U.S. PATENT DOCUMENTS

| 4,674,265 A | 6/1987 | Gerber |
| 4,718,223 A * | 1/1988 | Suzuki .................. A01D 46/30 56/328.1 |

(Continued)

FOREIGN PATENT DOCUMENTS

| CN | 201641541 U | 11/2010 |
| CN | 102 217 461 | 1/2013 |

(Continued)

OTHER PUBLICATIONS

International Search Report and Written Opinion prepared by the U.S Patent Office in International Application No. PCT/US2017/052404, dated Nov. 30, 2017.
(Continued)

*Primary Examiner* — Alicia Torres
*Assistant Examiner* — Matthew Ian Neal
(74) *Attorney, Agent, or Firm* — Lund IP, PLLC

(57) ABSTRACT

An example system includes a vacuum generating device, a robotic arm, and a harvesting device coupled to the robotic arm. The harvesting device includes an end-effector having an inlet; a vacuum tube coupled to the inlet of the end-effector and to the vacuum generating device, where the vacuum generating device is configured to generate a
(Continued)

vacuum environment in the vacuum tube; an outlet mechanism coupled to the vacuum tube; and a deceleration structure configured to decelerate fruit that has traversed at least a portion of the vacuum environment.

20 Claims, 26 Drawing Sheets

(51) Int. Cl.
    *A01D 46/30*     (2006.01)
    *A01D 46/24*     (2006.01)
    *B25J 9/16*     (2006.01)
    *B25J 11/00*     (2006.01)

(52) U.S. Cl.
    CPC ......... *B25J 9/1679* (2013.01); *B25J 11/0045* (2013.01)

(56) References Cited

U.S. PATENT DOCUMENTS

| | | | |
|---|---|---|---|
| 4,722,175 A * | 2/1988 | Hobhouse | A01D 51/002 56/327.1 |
| 5,170,614 A | 12/1992 | Williamson et al. | |
| 5,924,551 A | 7/1999 | Radmall | |
| 7,874,419 B2 * | 1/2011 | Hosch | B65G 21/20 198/841 |
| 8,371,773 B2 * | 2/2013 | Bryan, Jr. | B65G 69/16 406/84 |
| 8,997,446 B2 * | 4/2015 | Dietrich | A01D 46/005 56/328.1 |
| 2001/0037636 A1 * | 11/2001 | Mitchell | B65G 15/14 56/330 |
| 2008/0279640 A1 | 11/2008 | Bryan, Jr. et al. | |
| 2011/0047955 A1 | 3/2011 | Dietrich et al. | |
| 2012/0155974 A1 * | 6/2012 | Bryan, Jr. | A01D 46/24 406/82 |
| 2013/0064611 A1 * | 3/2013 | Kunzler | B65G 43/00 406/83 |
| 2017/0273241 A1 * | 9/2017 | Salisbury | A01D 46/24 |
| 2019/0029178 A1 * | 1/2019 | Russel | A01D 46/30 |

FOREIGN PATENT DOCUMENTS

| | | |
|---|---|---|
| FR | 2 531 604 | 2/1984 |
| GB | 2 155 747 | 10/1985 |
| JP | H07 246015 | 9/1995 |
| TW | M507637 U | 9/2015 |
| WO | WO 2016/090012 | 6/2016 |

OTHER PUBLICATIONS

Extended European Search Report prepared by the European Patent Office in Application No. 17853774.2, dated May 12, 2020.
First Examination Report prepared by the New Zealand Patent Office in Application No. 751397, dated Oct. 4, 2019.
2nd Office Action prepared by the Chinese Patent Office in Application No. 201780071727.0, dated Feb. 28, 2022.

\* cited by examiner

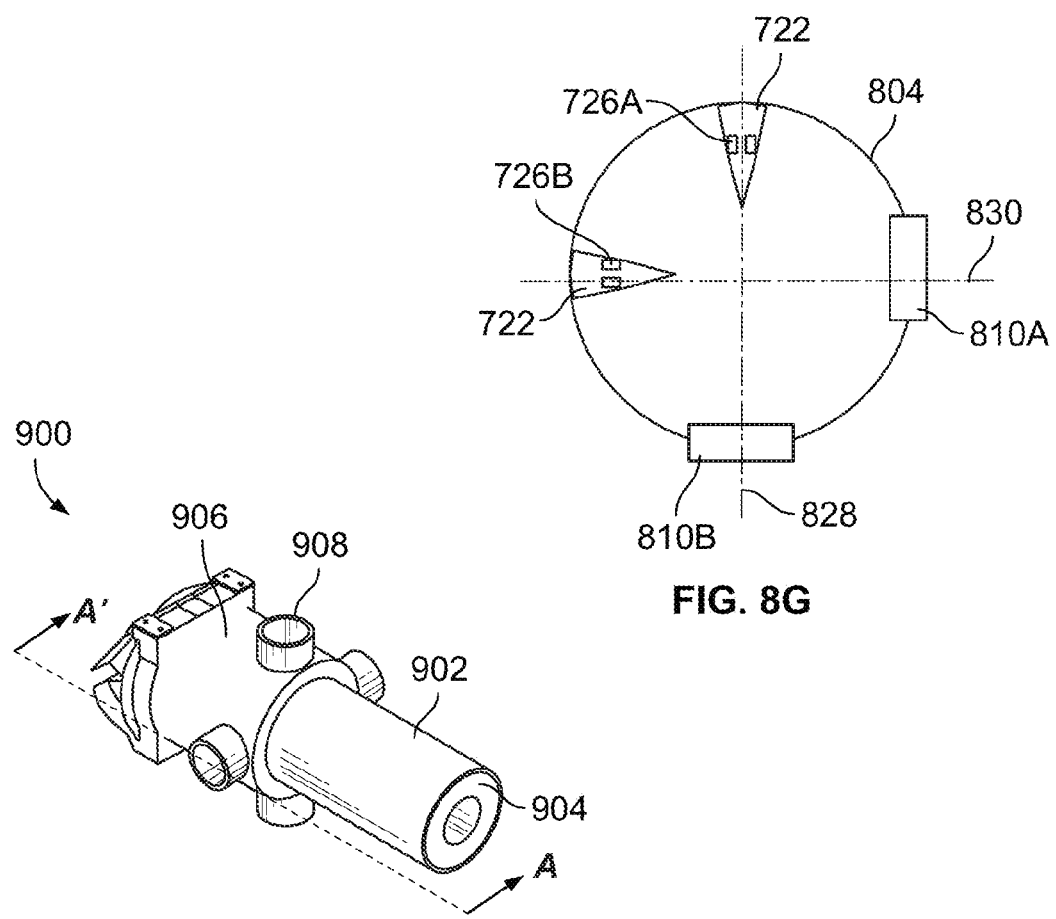
FIG. 8G
FIG. 9A
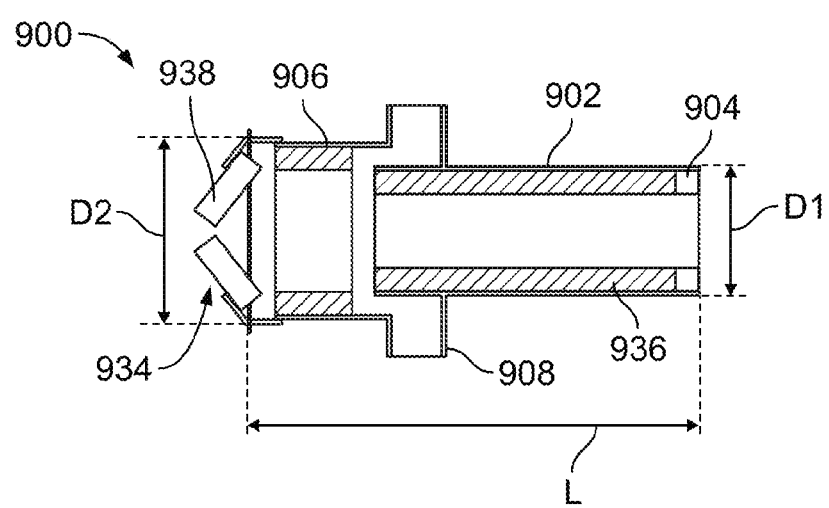
FIG. 9B

VACUUM GENERATING DEVICE FOR ROBOTIC HARVESTING

CROSS REFERENCE TO RELATED APPLICATION

The present application claims priority to U.S. Provisional patent application No. 62/397,456, filed on Sep. 21, 2016, and entitled "End Effector for Robotic Harvesting," the entire contents of which are herein incorporated by reference as if fully set forth in this description.

BACKGROUND

Fruit plucking and harvesting remains a largely manual process. In a fruit orchard in which fruit such as apples, pears, apricots, peaches, etc., grows on trees, a farm laborer may move a ladder near a tree, climb the ladder, pluck the fruit, and transfer the fruit to a temporary storage like a basket. After the worker has plucked all the ripe fruit in that location, the worker climbs down and moves the ladder to another location, then repeats the process. This process has high labor requirements, which result in high costs of operation, thus lowering profits made by the farmers.

Relying on manual labor may also have other risks. For instance, illness or other unavailability of workers may affect the labor supply. As another example, the lack of untrained workers can lead to careless handling or mishandling of the fruit. While picking fruit seems to require workers of low skill and training, a skilled farm worker may pluck as many as two fruits per second with relatively low losses due to damage, whereas untrained workers may work significantly slower, and may cause much higher losses due to damaged fruit. The cost of training workers may contribute to significant cost increases in operating the farm.

Therefore, it may be desirable to have mechanized fruit harvesting systems that alleviate some of the risks associated with manual labor. An example mechanized system may have an end-effector configured to pluck a fruit rather than plucking the fruit manually. To reduce the cost of such mechanized system, it may be desirable to have a mechanized system that does not require accurate positioning of the end-effector to effectively pluck the fruit.

SUMMARY

The present disclosure describes embodiments that relate to systems for robotic harvesting.

In one aspect, the present disclosure describes a fruit harvesting robotic system. The fruit harvesting robotic system includes: (i) a vacuum generating device; (ii) a robotic arm; (iii) a harvesting device coupled to the robotic arm and including: (a) an end-effector having an inlet, (b) a vacuum tube coupled to the inlet of the end effector and to the vacuum generating device, where the vacuum generating device is configured to generate a vacuum environment in the vacuum tube, and where the inlet of the end-effector has a size that allows fruit of a particular type to pass through the inlet and enter the vacuum environment in the vacuum tube, (c) an outlet mechanism coupled to the vacuum tube, where fruit that has entered the vacuum environment is able to exit the vacuum environment through the outlet mechanism, and (d) a deceleration structure configured to decelerate fruit that has traversed at least a portion of the vacuum environment without damaging fruit; and (iv) a controller configured to perform operations including causing the robotic arm to move the harvesting device to position the inlet of the end-effector within a predetermined distance from a fruit attached to a tree, wherein the vacuum environment generates an airflow through the inlet, thereby inducing a force to be applied to the fruit, pulling the fruit through the inlet into the vacuum tube and separating the fruit from the tree.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8G illustrates a front view of a tube configured to accommodate various orientations of fruits growing in a cluster, in accordance with an example implementation.

FIG. 9A illustrates a perspective view of an end-effector, in accordance with an example implementation.

FIG. 9B illustrates a cross-sectional view of the end-effector shown in FIG. 9A along plane A-A' shown in FIG. 9A, in accordance with an example implementation.

DETAILED DESCRIPTION

Figure 1:
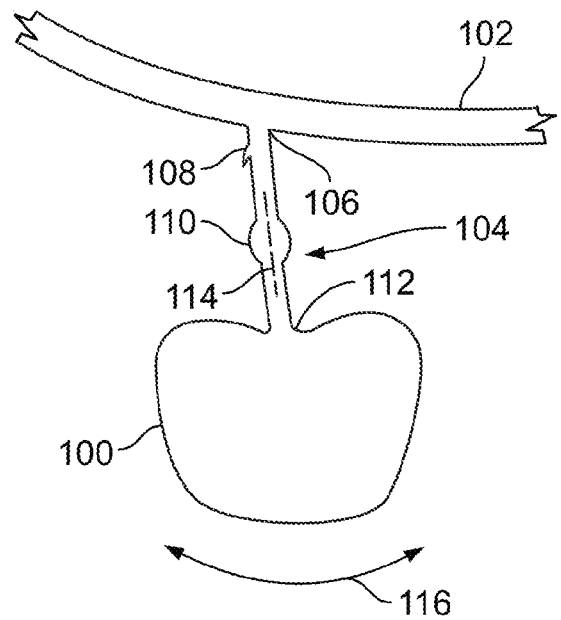
FIG. 1 illustrates an apple attached to a tree, in accordance with an example implementation.

FIG. 1 illustrates a fruit 100 attached to a tree, in accordance with an example. The fruit 100 is represented herein as an apple for illustration as an example fruit; however, the description herein can apply to different types of stemmed fruits such as pears or any other fruit.

As shown in FIG. 1, a tree branch 102 has the fruit 100 attached by a stem 104. A section where the fruit 100 grows from the tree branch 102 may be referred to as a spur pull 106. A spur 108 grows from the spur pull 106.

The spur 108 supports the fruit 100 and remains attached to the tree branch 102 after plucking the fruit 100 to support next season's fruit. Damage to the spur 108 may result in a fruit not growing from this section of the tree next season.

The stem 104 may further include an abscission 110 further down from the spur 108. The abscission 110 is illustrated as a bulge and may be composed of fibers. As the fruit 100 ripens, the fibers of the abscission 110 might no longer be able to hold the weight of the fruit 100, and the fruit 100 may thus fall off the tree separated at the abscission 110. To pluck or harvest the fruit 100 without causing damage to the spur 108, it may be desirable to separate the fruit 100 from the stem 104 at the abscission 110.

The stem 104 attaches to the fruit 100 at a stem pull 112. While harvesting or plucking the fruit 100, it may be desirable to not damage the skin of the fruit 100 in an area around the stem pull 112. Damage to this area may provide a pathway for pathogens to enter the fruit 100 and cause rapid rotting.

Detaching the fruit 100 at the abscission 110 may have several advantages. For instance, detaching the fruit 100 at the abscission 110 emulates the fruit 100 detaches naturally, and thus might not harm the fruit 100 while being plucked, and might not endanger next season's crop. Further, given the orientation of the fibers at the abscission 110, an effective way to detach the fruit 100 may involve twisting the fruit 100 at an angle to a longitudinal abscission axis 114 of the stem 104. For instance, the fruit 100 may be twisted in a direction represented by arrow 116. However, other twisting directions are possible such as out of the plane of the page, or any twisting direction that creates an angle to the abscission axis 114 to successfully detach the fruit 100 at the abscission 110.

In examples, pulling or twisting the fruit 100 about the abscission axis 114 without angling might also be successful. However, in examples, such detachment technique may be more difficult, may require more energy, and may result in damaging the fruit 100. Specifically, the longitudinal arrangement of the fibers along the stem 104 may prevent efficient separation of the fruit 100 by pulling or twisting along the abscission axis 114 without angling.

As such, a mechanical or an electromechanical system for harvesting the fruit 100 may advantageously detach the fruit 100 at the abscission 110 by applying a force that angles the fruit 100 relative to the abscission axis 114. Disclosed herein ire example systems that use vacuum to apply a force to the fruit 100 at an angle relative to the abscission axis 114.

Figure 2A:
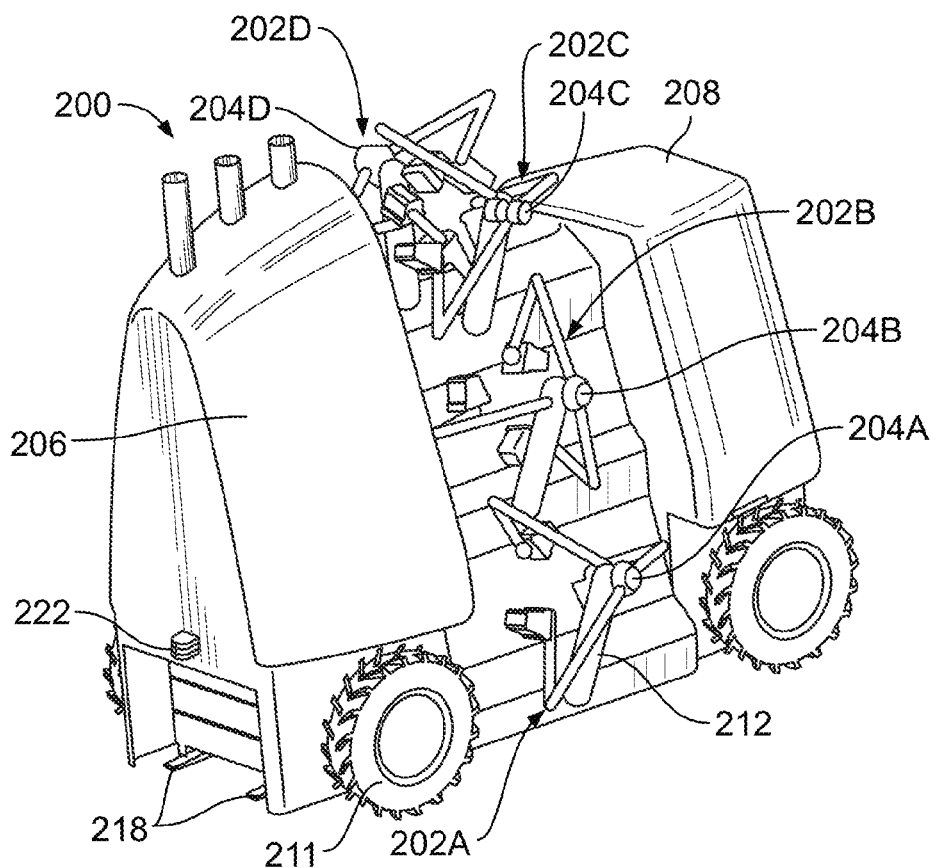
FIG. 2A illustrates a robotic system for harvesting, in accordance with an example implementation.
Figure 2B:
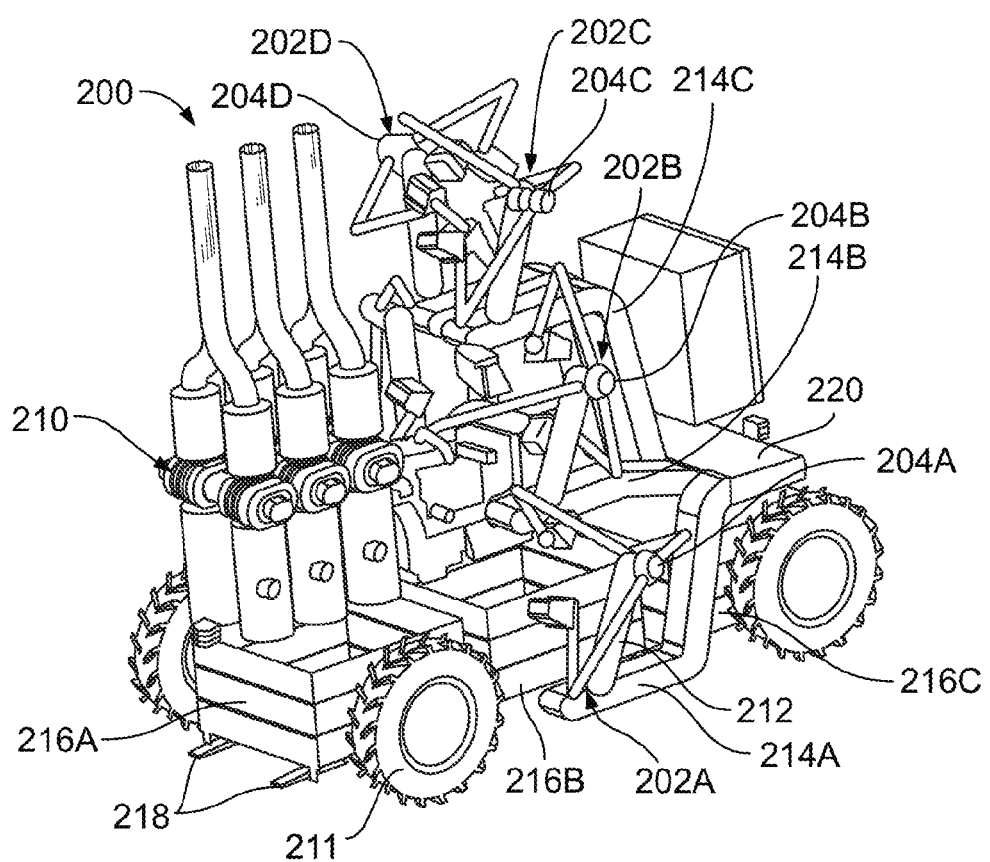
FIG. 2B illustrates internal configuration of the robotic system shown in FIG. 2A, in accordance with an example implementation.

FIG. 2A illustrates a robotic system 200 for harvesting, and FIG. 2B illustrates internal configuration of the robotic system 200, in accordance with an example implementation. The robotic system 200 may include robot arms 202A, 202B, 202C, and 202D. The robot arms 202A-202D are configured to move respective vacuum-based end-effectors 204A, 204B, 204C, and 204D to pick fruits. The robot arms 202A-202D may be located on both sides of the robotic system 200. More or fewer robot arms could be used than shown in FIGS. 2A-2B, and the positions and orientations of the robot arms 202A-202D may be passively or actively adjusted to accommodate variations in architecture of the robotic system 200.

FIG. 2A shows covers 206 and 208 that cover internal components of the robotic system 200. FIG. 2B illustrates the robotic system 200 with the covers 206 and 208 removed to reveal the internal configuration of the robotic system 200.

Various types of engines such as a combustion or an electric engine may be used to power the motion of the robotic system 200, to power a vacuum subsystem, and power other subsystems as well. For example, the robotic system 200 may include an engine 210. The engine 210 may be coupled to multiple vacuum systems in parallel to enable the engine power to flow to a vacuum system (of the multiple vacuum systems) subjected to the largest load. In examples, if a combustion engine is used, the engine 210 may then be configured to drive an electric generator configured to provide electric power to various subsystems of the robotic system 200. Additionally, the robotic system 200 may have a fuel tank or batteries or both.

As seen in FIGS. 2A-2B, the robotic system 200 may be configured as a mobile platform. As such, the robotic system 200 may have wheels, such as wheel 211, that enable moving and steering the robotic system 200. The wheels may be driven via a transmission system coupled to the engine 210, and may be driven and steered independently or in a coupled fashion.

As described in detail below, the robot arms 202A-202D, and specifically their respective end-effectors 204A-204D, are configured to pluck fruits (e.g., apples) of an orchard. The robotic system 200 is configured to then provide or transmit the plucked fruits to a conveyance mechanism that then delivers the fruits to a bin. Several techniques could be used by the robotic system 200 to deliver the plucked fruits to the conveyance mechanism.

In one such technique shown in FIGS. 2A and 2B, collection tubes such as collection tube 212 coupled between a respective end-effector (e.g., the end-effector 204A) and the conveyance mechanism. The fruit exits a respective end-effector and travels through the collection tube and is deposited onto the conveyance mechanism.

The conveyance mechanism may include a system of conduits and belts that carries the fruit to a storage bin. For example, the conveyance mechanism may include conduits 214A, 214B, and 214C configured to deliver fruits plucked by their respective robot arms 202A, 202B, and 202C to the conveyance mechanism. For example, the conduit 214A may carry fruit harvested by the robot arm 202A, the conduit 214B may carry fruit harvested by the robot arm 202B, and so on. Each of the conduits 214A-214C may have a respective conveyor belt that carries fruit plucked via the robot arms 202A-202D to the storage bin. The robotic system 200 further includes a bin handling system that manages the storage bins.

As shown in FIG. 2B, the bin management system may include multiple bins such as bins 216A, 216B, and 216C. Initially, empty bins may be placed on a ground of an orchard in front of the robotic system 200 with a spacing appropriate to the spatial and temporal rate of bin filling. When the robotic system 200 enters an orchard, the robotic system 200 may be configured to detect a bin and its location, and then pick the bin via front forks 218 at a front of the robotic system 200 off the ground. The robotic system 200 may also include chains or belts that pull the bin picked by the front forks 218 to place the bin on a conveyor that then conveys the bin and positions it underneath a bin filler 220 where the fruits are dispensed by the conveyance mechanism.

For example, the bin 216C may be picked by the front forks 218 and is then conveyed to be placed underneath the bin filler 220 as depicted in FIG. 2B. The conveyer mechanism conveys fruits to the bin filler 220, which then places, releases, or drops the fruits in the bin 216C. As the bin 216C becomes full, the conveyor of the bin handling system is activated to move the bin 216C and place it on back forks (not shown and similar to the front forks 218) located at a back end of the robotic system 200. The robotic system 200 then uses the back forks to release the bin 216C and set it on the ground behind the robotic system 200 while the robotic system 200 continues to move forward and harvest more fruit.

As the bin 216C is released from the robotic system 200, the bin 216B moves into position underneath the bin filler 220 so that fruits now fall into the bin 216B. The operation is repeated with each bin filling up, released from the robotic system 200, and set on the ground to be collected at a later time by other resources.

In many orchards, the trees may be planted in rows with a path in between the rows. The robotic system 200 may travel down such path. The robotic system 200 may have robot arms (e.g., the robots arms 202A-202D) on both sides thereof, and thus the robotic system 200 may position itself in a centered trajectory along the path. In examples, robotic system 200 may include sensors such as sensor 222 configured to detect the tree canopy and determine where the mid-plane between two canopy surfaces is. The sensor 222 may include contact proximity sensors, etc. To further facilitate driving and positioning the robotic system 200, the robotic system 200 may further include speed sensor, Global positioning satellite (GPS) sensors, wheel rotational displacement measurements (e.g., optical encoders), or other sensors, etc.

In examples, camera sensors (e.g., the sensor 222) at the front end of the robotic system 200 may be configured to provide an initial picture of the canopy for pre-planning of the picking motion strategy. The robotic system 200 may further include sensors configured to provide to a controller of the robotic system 200 information related to the quality of fruits as they are being plucked and delivered to the bin. Further, sensors such as load cells or weight sensors may be integrated into the bin conveyor in order to determine the weight of the bin. The controller may then determine whether the bin is full based on its weight.

In other examples, sensors such optical proximity sensors may be integrated into the bin filler 220 to determine the fill height of the bin. Further, sensors such as cameras or LIDAR devices coupled to the robotic system 200 may facilitate determining position or coordinates of an empty bin relative to the location of the robotic system 200. The robotic system 200 may then adjust its position to be able to pick up the empty bin.

The sensors coupled to the robotic system 200 may also facilitate determining whether a full bin has successfully been released and set on the ground behind the robotic system 200. These sensors may also be used to detect the presence of people or animals to enable the controller of the robotic system 200 to safely navigate the robotic system 200 around the orchard. When the robotic system 200 reaches the end of a row of trees, it may stop or navigate to the next row of trees. Sensors such as GPS, LIDAR devices, and cameras may be included to facilitate such navigation operations. Other sensor systems are possible.

In examples, the robot arm 202A-202D may be cascaded to prevent fruits that fall during picking activities from impacting lower fruits. As such, the robot arms responsible for picking fruits at the lowest elevation (e.g., the robot arm 202A) may be positioned toward the front of the robotic system 200, whereas robot arms responsible for picking fruits at the highest elevation (e.g., the robot arm 202C and 202D) may be positioned toward the back of the robotic system 200. To enable the cascading and to accommodate various canopy shapes, the robotic system 200 may be configured to have the capability to modify the angle and the inclination of the robot arms 202A-202D.

Figure 3A:
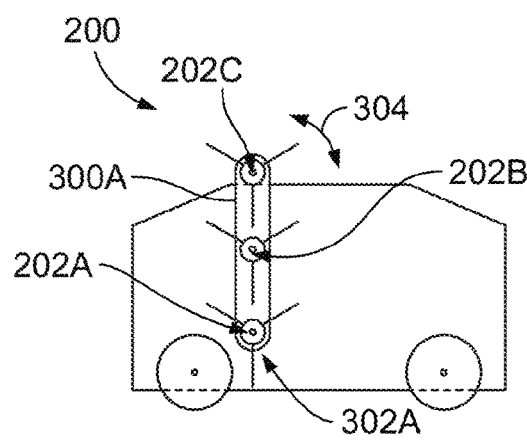
FIG. 3A illustrates robot arms mounted to a carriage, in accordance with an example implementation.

FIG. 3A illustrates the robot arms 202A-202C mounted to a carriage 300A, in accordance with an example implementation. As shown in FIG. 3A, multiple robot arms may be arranged on the carriage 300A. The carriage 300A may have a two degrees-of-freedom (DOF) hinge 302A. In FIG. 3A, arrow 304 illustrates an example direction of rotation of the carriage 300A about the hinge 302A, where the direction of rotation represents a first DOF.

Figure 3C:
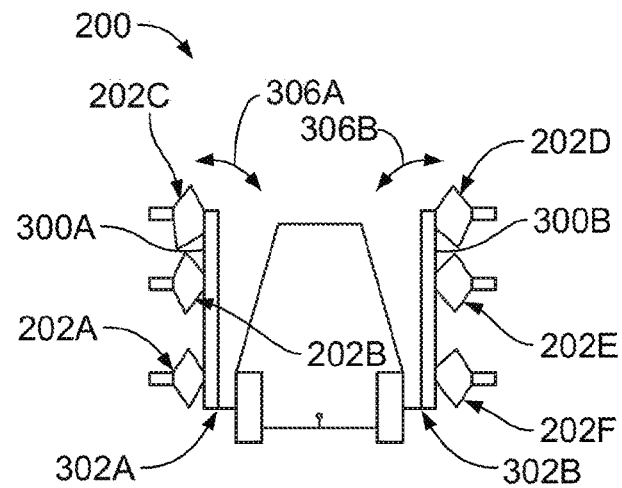
FIG. 3C illustrates a back view of the robotic system shown in FIG. 2A showing carriages, in accordance with an example implementation.
Figure 3B:
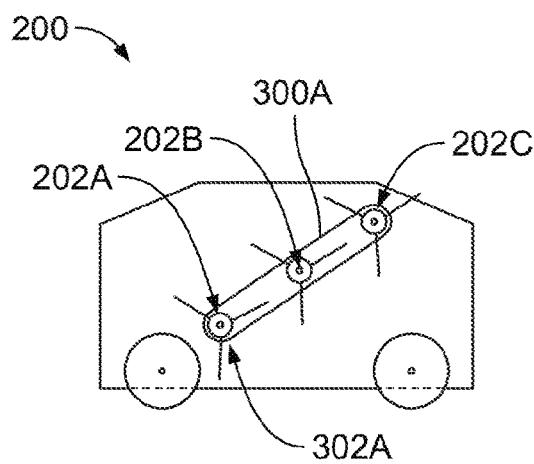
FIG. 3B illustrates a carriage rotated about a hinge in a particular direction, in accordance with an example implementation.

FIG. 3B illustrates the carriage 300A rotated about the hinge 302A in a direction of the arrow 304, in accordance with an example implementation. As depicted, the carriage 300A is rotated to allow the robot arms 202A-202C to be cascaded and prevent fruits from falling and damaging other fruits. With this flexibility, various canopy shapes may be accommodated for.

FIG. 3C illustrates a back view of the robotic system 200 showing carriages 300A and 300B, in accordance with an example implementation. As shown in FIG. 3C, the robot arms 202A-202C are mounted to the carriage 300A, whereas robot arms 202D, 202E, and 202F are mounted to carriage 300B on the other side of the robotic system 200. The carriage 300B is mounted to the robotic system 200 via a hinge 302B. In FIG. 3C arrows 306A and 306B illustrates example directions of rotation about of the respective carriages 300A and 300B, where the directions of rotations indicated by the arrows 306A, 306B represent a second DOF.

Figure 3D:
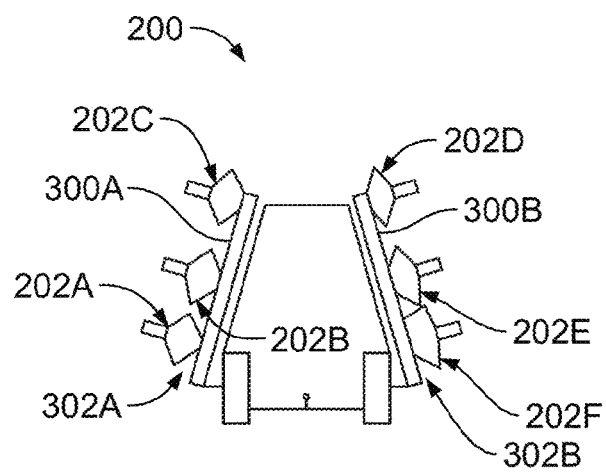
FIG. 3D illustrates the carriages shown in FIG. 3C rotated about respective hinges in a particular direction, in accordance with an example implementation.

FIG. 3D illustrates the carriages 300A-300B rotated about respective hinges 302A-302B in the direction of arrows 306A-306B, in accordance with an example implementation. As depicted, the carriage 300A is rotated to allow the robot arms 202A-202C to be cascaded, and the carriage 300B is also rotated to allow the robot arms 202D-202F to be cascaded. As such, damaging fruits disposed at low elevations may be precluded. Also, with this flexibility, various canopy shapes may be accommodated for.

Figure 4:
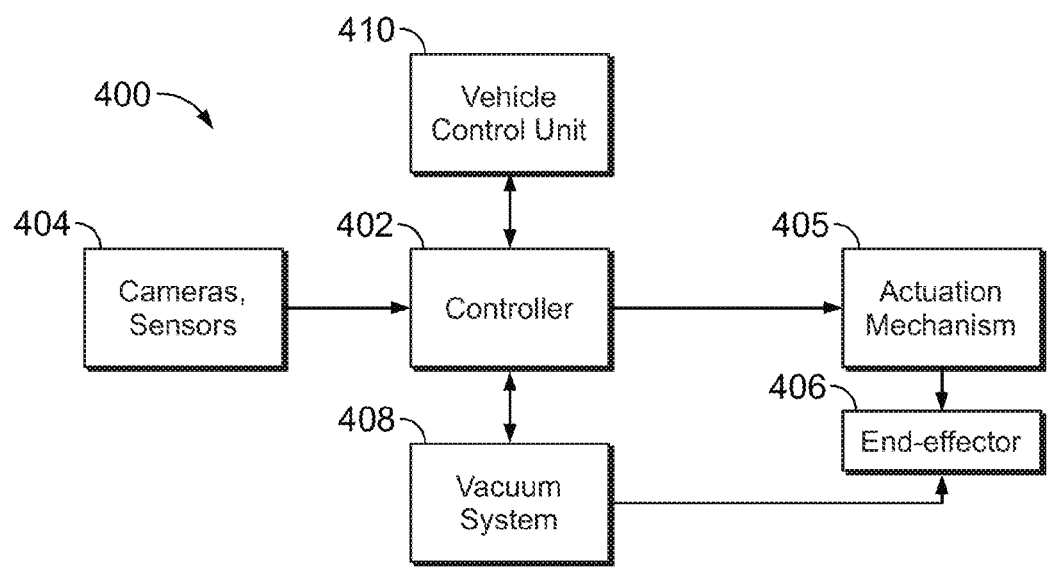
FIG. 4 illustrates a control system of a robotic system, in accordance with an example implementation.

FIG. 4 illustrates a control system 400 of the robotic system 200, in accordance with an example implementation. Several elements of the control system 400 have been described above. The control system 400 may include a controller 402, which could include any type of processors, microprocessors, computing devices, and data storage devices (memories, transitory and non-transitory computer readable media, etc.). The controller 402 may be configured to receive information from various sensors 404 (e.g., cameras, speed sensors, LIDAR devices, etc.) coupled to the robotic system 200. The controller 402 may accordingly send signals to various actuation mechanisms of the robotic system 200. For instance, the controller 402 may send signals to actuation mechanism 405 that controls position of an end-effector 406. The end-effector 406 may represent any of the end-effectors described in this disclosure. Also, the controller 402 may send signals to the vacuum system 408, which is configured to generate a vacuum to enable the end-effector 406 to pluck fruits.

As an example, the end-effector 406 or an associated robot arm may have a vision sensor coupled thereto. The vision sensor may provide images to the controller 402. The controller 402 may detect multiple fruits in each image. For instance, the controller 402 may use image recognition techniques to identify groups of pixels, with each group of pixels representing a fruit. The controller 402 may then localize locations of the detected fruits by building a map having three-dimensional (3D) coordinates of the fruits. The controller 402 may then generate a plan having a sequence in which the fruits are to be plucked based on their locations in 3D space and the location of the robot arms 202A-202D and their respective end-effectors (e.g., the end-effector 406).

In generating the plan, the controller 402 may rely on the images to determine locations of obstacles to be avoided while moving the end-effectors such as but not limited to the branches, trellis wire, and trellis posts. The controller 402 may then send a signal to the actuation mechanism 405 to move the end-effector 406 to an appropriate position in proximate to a fruit to be plucked next, and activate the vacuum system 408 to generate the vacuum sufficient to pluck the fruit.

In addition to using information received from vision sensors, the controller 402 can use information from sensors such as proximity sensors to achieve precise positioning of the end-effector 406. As an example, the proximity sensor may be utilized to modulate the speed at which the end-effector 406 approaches a fruit so that damage to the fruit is minimized. Thus, as an end-effector 406 approaches the fruit, the proximity sensor may send signals to the controller 402, which would consequently send control signals back to the actuation mechanism 405 and modulate the speed with which the end-effector 406 approaches the fruit.

In controlling the vacuum system 408, the controller 402 may send the control signal based on signals received from various sensors so that the vacuum pressure, and therefore the speed of harvesting, can be adjusted or modified. If the fruit is being harvested too quickly, the vacuum pressure may be reduced so that fruits might not be plucked as quickly to preclude damage. Adjusting the vacuum pressure may be triggered by other factors such as but not limited to presence of moisture on some fruit and not on others, differences in fruit size from tree to tree, or differences in the ripeness.

The sensors or cameras integrated within the path of the fruit in the vacuum system 408 may take images of the fruit and assess the quality or other characteristics of the fruit. Based on this information, the vacuum pressure may be adjusted. The controller 402 may thus adjust the vacuum pressure in real-time.

Further, the controller 402 may be configured to control motion and positioning of the robotic system 200. Particularly, the control system 400 may have a vehicle control unit 410 that may include the engine 210, transmission, steering units, batteries, generators, etc. The controller 402 may provide signals to the vehicle control unit 410 to control the movement of the robotic system 200 based on a determined harvesting action to be performed by the robotic system 200. For example, the controller 402 may calculate a proper position of the robotic system 200 in relation to the tree so that the fruit from one tree may be harvested in as few adjustments of the location of the robotic system 200 and end-effector 406 as possible. As such, throughput (the amount of fruits harvested in a unit of time) may be improved. The control system 400 may control other modules, hardware and software, as well.

As mentioned above, the robotic system 200 uses several robot arms 202A-202F to position respective end-effectors in proximity of fruits to be plucked. A vacuum system is used to generate a vacuum that facilitates plucking the fruit via the end-effectors.

Figure 5:
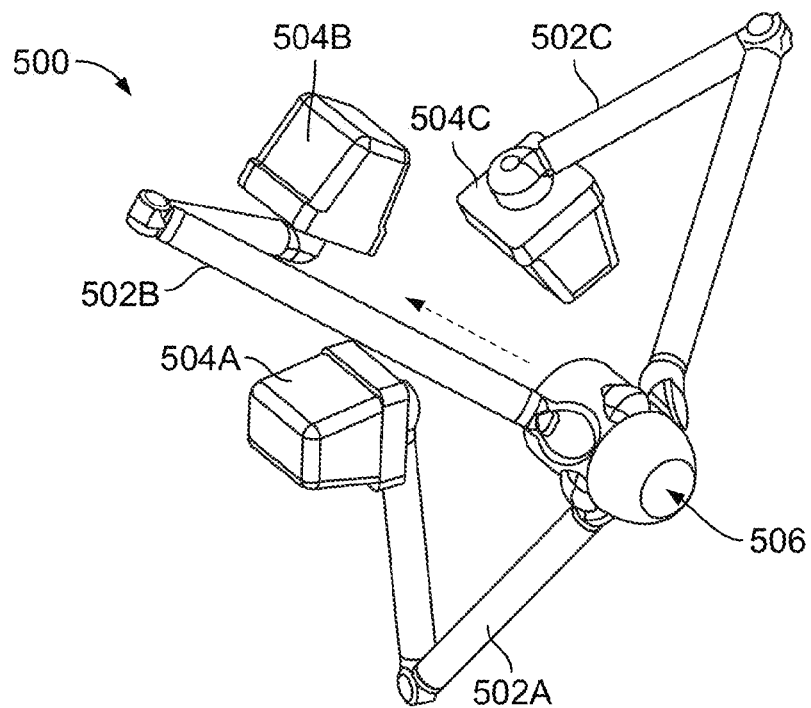
FIG. 5 illustrates a robot arm system, in accordance with an example implementation.

FIG. 5 illustrates a robot arm system 500, in accordance with an example implementation. The robot arm system 500 may represent any of the robot arms 202A-202F described above. As depicted in FIG. 5, the robot arm system 500 may have multiple arms having hinged links such as links 502A, 502B, and 502C. Although three arms are illustrated, the robot arm system 500 may include fewer or more arms.

Links of each arm may be multi-jointed and may be actively driven by respective actuation mechanisms 504A, 504B, and 504C coupled to a structure or frame of the robotic system 200. Various types of actuation mechanism may be utilized such as but not limited to motors (electric or hydraulic). The robot arm system 500 may also have an end-effector 506. The end-effector 506 may represent any of the end-effectors described herein.

The actuation mechanisms 504A-504C are configured to position the end-effector 506 so that the end-effector 506 can be brought close to the fruit to be harvested. The controller of the robotic system 502 may be configured to determine the dynamic or oscillatory characteristics of the robot arm system 500 based on sensor inputs, and accordingly provide compensating motions with the actuation mechanisms 504A-504C. As such, the controller may place the end-effector 506 at the desired location despite motions of the base of the robotic system 200 or the carriage (e.g., the carriage 300A or 300B) to which the robot arm system 500 is mounted.

In order to provide the end-effector 506 with vacuum, a vacuum subsystem may be integrated into the robotic system 200. In an example, in order to provide and sustain the desired flow rate of air during a fruit picking event, separate vacuum blowers may be provided for each end-effector 506. In another example, a single vacuum blower can be used, and valves could be used to adjust vacuum power and direction based on the load on the end-effector(s) 506. The vacuum subsystem may include filters for the collection of leaves, twigs, etc. The vacuum subsystem may also include silencers and exhaust pipes to control the direction of the exhaust airflow.

Vacuum may be provided in several ways to the end-effector 506. In one example, the arms or links 502A-502C of the robot arm system 500 may be hollow to operate as a conduit fluidly coupled to a blower or a similar device. In another example, flexible tubing or hoses may be used to convey the vacuum environment to the end-effector 506. Details and configurations of vacuum-based end-effectors are described below.

Figure 6A:
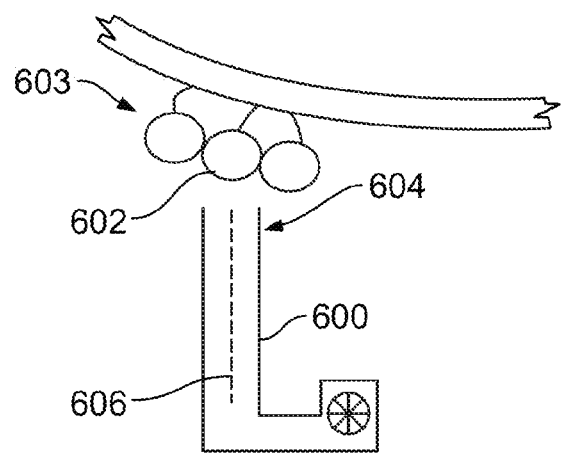
FIG. 6A illustrates a schematic representation of a vacuum-based harvesting system, in accordance with an example implementation.

FIG. 6A illustrates a schematic representation of a vacuum-based harvesting system 600, in accordance with an example implementation. The harvesting system 600 is shown in the vicinity of or within a predetermined distance (e.g., 2 centimeters or a distance in a range between 1 and 5 centimeters) from a targeted fruit 602 growing in a cluster 603 of fruits. An advantage of the vacuum-based harvesting system 600 is that the targeted fruit 602 can be plucked without physical contact between an end-effector 604 and the targeted fruit 602 before or during the process of plucking. As such, the risk of injury to the targeted fruit 602 during plucking is reduced.

Figure 6B:
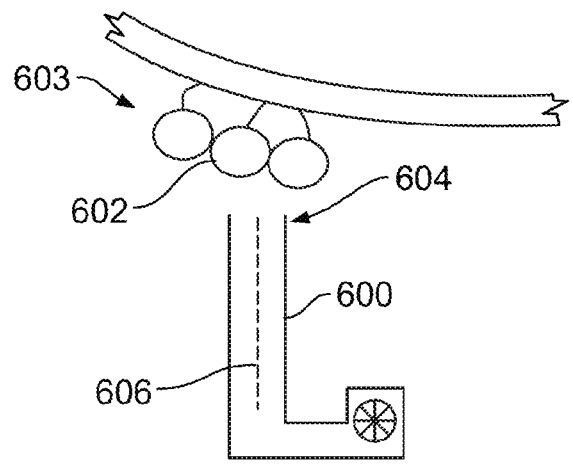
FIG. 6B illustrates the vacuum-based harvesting system shown in FIG. 6A with an end-effector misaligned with respect to a fruit, in accordance with an example implementation.

A second advantage of the vacuum-based harvesting system 600 is that the targeted fruit 602 can be plucked successfully without injury to neighboring fruits even if the end-effector 604 is misaligned with the fruit 602. In FIG. 6A, the end-effector 604 is aligned with the fruit 602. However, FIG. 6B illustrates the vacuum-based harvesting system 600 with the end-effector 604 misaligned with respect to the targeted fruit 602. As shown in FIG. 6B, the end-effector 604 is inaccurately positioned with respect to the targeted fruit 602. Particularly, the end-effector 604 is aligned with a region between two neighboring fruits.

If a harvesting system employs a mechanical gripper (e.g., jaws) that contacts the fruit to pluck it, then inaccurate positioning or misalignment between the gripper and the fruit may cause damage to the fruit and its neighboring fruits. However, because the vacuum-based harvesting system 600 relies on generated vacuum pressure to attract the targeted fruit 602 toward the end-effector 604, the vacuum-based harvesting system 600 may be more forgiving and may tolerate inaccuracies and misalignment while successfully plucking the targeted fruit 602 without causing damage thereto.

In examples, the vacuum-based harvesting system 600 may tolerate inaccuracies within reasonable limits, such as having a vacuum axis 606 less than a radius of the targeted fruit 602 away from a core of the targeted fruit 602, or other measures applied to other types of fruit. As a result of the vacuum-based harvesting system 600 being tolerant of misalignment and inaccuracies as opposed to mechanical gripping system, the vacuum-based harvesting system 600 can be moved quicker from one fruit to the next due to the reduced. Thus, a higher efficiency measured in terms of the rate at which fruits may be plucked can be achieved.

Further, in a mechanical gripper system, a respective gripper plucks the fruit then moves to place the fruit in a storage bin. Such "pick and place" system may be less efficient due to the time it takes to pick and then place the fruit. As such more time is consumed in releasing the fruit from the gripper.

In contrast, in some example implementations, the vacuum-based harvesting system 600 may be more efficient as the "pick" operation may be decoupled from the "place" operation. In the vacuum-based harvesting system 600, the end-effector 604 may include a nozzle or suction cup disposed at and coupled to an end of a vacuum tube. The suction cup may be brought close to the targeted fruit 602, and due to the vacuum, the targeted fruit 602 may become detached from the tree and adhere to the suction cup. A conveyance system as described above with respect to FIGS. 2A-2B may be coupled to the end-effector 604 to deliver the fruit to the bin handling system, so as to free the end-effector 604 to immediately perform another "pick" operation.

As mentioned above, detaching a fruit at its abscission may reduce the likelihood of damaging the fruit or next season's crop. An end-effector of a vacuum-based harvesting system may advantageously be placed at an angle to the fruit relative to its abscission axis so as to detach the fruit at the abscission.

Figure 7A:
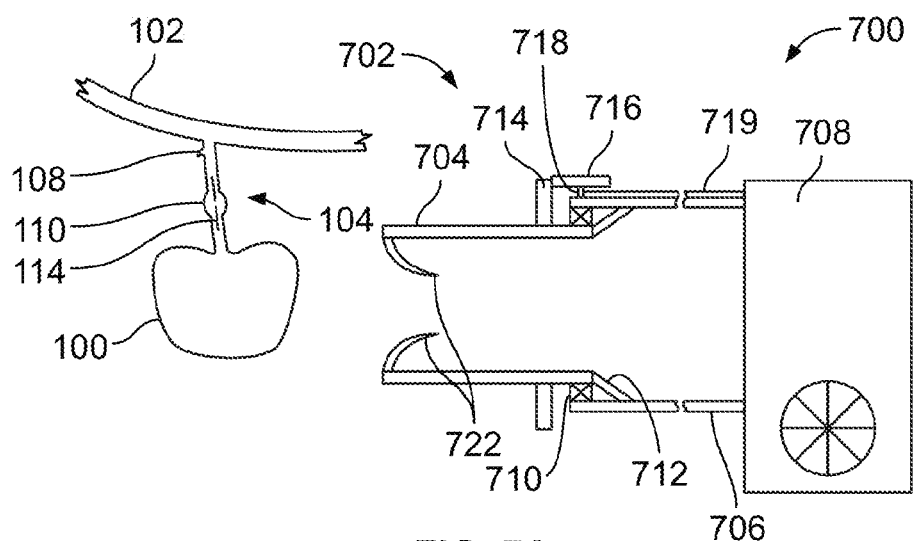
FIG. 7A illustrates a harvesting system having a vacuum-based end-effector configured to apply a twist at an angle to the abscission axis of a fruit, in accordance with an example implementation.

FIG. 7A illustrates a harvesting device or system 700 having a vacuum-based end-effector 702 configured to apply a twist at an angle to the abscission axis 114 of the fruit 100, in accordance with an example implementation. The harvesting system 700 may include two concentric tubes 704 and 706. The tube 704 may rotate within the tube 706, which may remain stationary and coupled to a vacuum generating device 708.

To facilitate rotation of the tube 704, a bearing 710 may be disposed or mounted between an outside diameter of tube 704 and the inside diameter of tube 706 to provide a rotational surface upon which the tube 704 may rotate. The arrangement of the bearing 710 between the two tubes 704, 706 may provide sufficient structural support for the inside tube 704. Other support structures may be used to facilitate stable rotation of the tube 704 within the tube 706.

To prevent loss of vacuum, a rotatable seal 712 may be provided. The rotatable seal 712 may be coupled immovably to an end of the tube 704 as shown and may rotate with minimal or no clearance against the inside diameter of tube 706. Although some vacuum may be lost, the rotatable seal 712 may preserve a sufficient portion of the vacuum for the harvesting system 700 to operate. Other methods of sealing are possible.

In examples, to cause the tube 704 to rotate, a gear 714 may be coupled to its outside diameter. The gear 714 is rotatable about a first axis and may be configured to mesh with another gear 716 rotatable about a second axis perpendicular to the first axis. The gear 716 may couple to an axle 718. A motor (not shown) may drive a belt 719, which in turn may drive the axle 718, causing the gear 716 to rotate, thereby causing the gear 714 and the tube 704 to rotate.

Figure 7B:
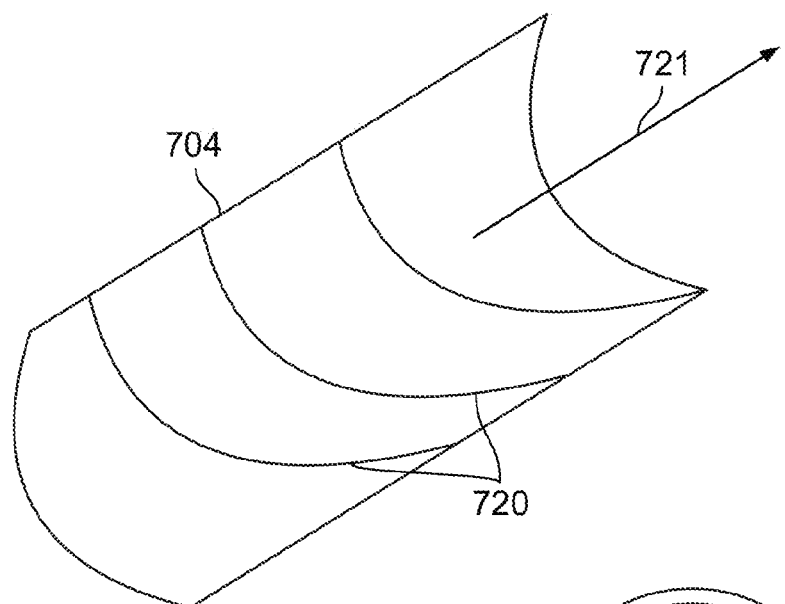
FIG. 7B illustrates a perspective view of a cut section of a tube, in accordance with an example implementation.

Other techniques could be used to rotate the tube 704. FIG. 7B illustrates a perspective view of a cut section of the tube 704, in accordance with an example implementation. In the example implementation of FIG. 7B, the inside diameter of the tube 704 may have ribs 720. Upon application of a vacuum in a direction of arrow 721, the tube 704 may rotate about its longitudinal axis. The ribs 720 may include low height projections and may be made of soft material such that minimal or no damage to the fruit 100 is incurred as the fruit 100 is pulled into the tube 704 by the vacuum.

In examples, as shown in FIG. 7A, a distal end of the tube 704 may include flexible projections 722 coupled to an interior peripheral surface of the tube 704 and protruding inwardly toward a center of the tube 704. The projections 722 may be attached to the interior peripheral surface of the tube 704 and can rotate as a group as the tube 704 rotates. As illustrated in FIG. 7A, the projections 722 may bend inward if a load is applied to their outside surface facing the fruit 100.

In operation, when the vacuum generating device 708 turns on and the entire harvesting system 700 moves close to the fruit 100 (e.g., within a predetermined distance such as 1-5 centimeters from the fruit 100), the fruit 100 may swing toward the tube 704. As the tube 704 contacts the fruit 100, the flexible projections 722 may loosely capture the fruit 100. If the flexible projections 722 rotate, the fruit 100 may also rotate along with the flexible projections 722. This combination of the vacuum force and a twisting force at an angle to the abscission axis 114 applied to the fruit 100 may lead to detachment from the stem 104 at the abscission 110.

Figure 7C:
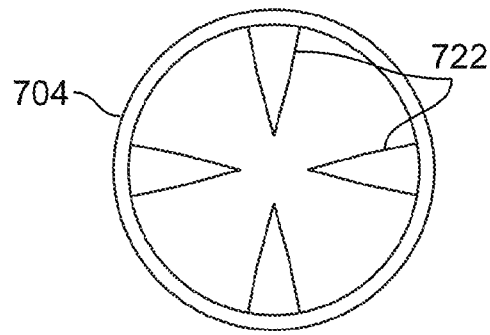
FIG. 7C illustrates a front view depicting a distal end of a tube, in accordance with an example implementation.

FIG. 7C illustrates a front view depicting the distal end of the tube 704, in accordance with an example implementation. The projections 722 may be composed of any flexible and soft material such as but not limited to rubber and soft plastic. Other configurations of the projections 722 are possible.

Figure 7D:
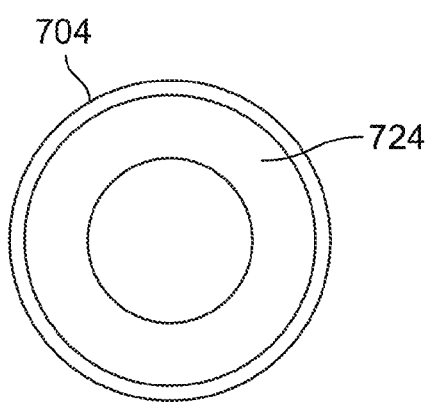
FIG. 7D illustrates projections configured as a flexible plate, in accordance with an example implementation.

FIG. 7D illustrates the projections 722 configured as a flexible plate 724, in accordance with an example implementation. The flexible plate 724 capable of bending inward. Similar to the projections 722 in FIG. 7C, the flexible plate 724 may be made of flexible or compliant materials such as but not limited to rubber and soft plastic.

Figure 7E:
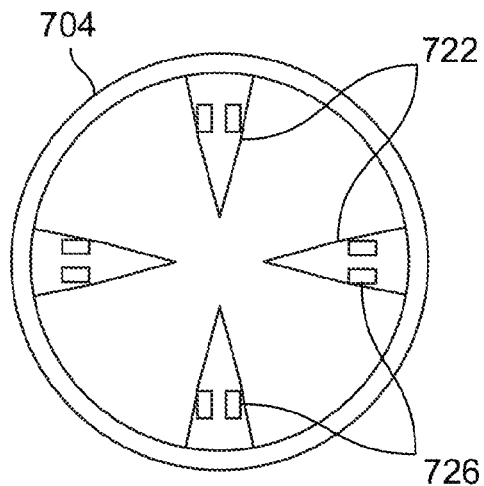
FIG. 7E illustrates projections having one or more pairs of electrodes, in accordance with an example implementation.

In examples, the projections 722 illustrated in FIG. 7C or the flexible plate 724 may include electrodes to facilitate attracting the fruit 100 thereto during plucking. FIG. 7E illustrates the projections 722 having one or more pairs of electrodes 726, in accordance with an example implementation. An appropriate voltage applied across the electrodes 726 may create an electroadhesive force between the electrodes 726 and the fruit 100, causing the fruit 100 to be attracted to the electrodes 726. U.S. Pat. No. 7,551,419, assigned to SRI International, describes the principles of electroadhesion in detail. In examples, the electrodes 726 could be coupled to the flexible plate 724 if the flexible plate 724 is used instead of the projections 722.

Figure 8A:
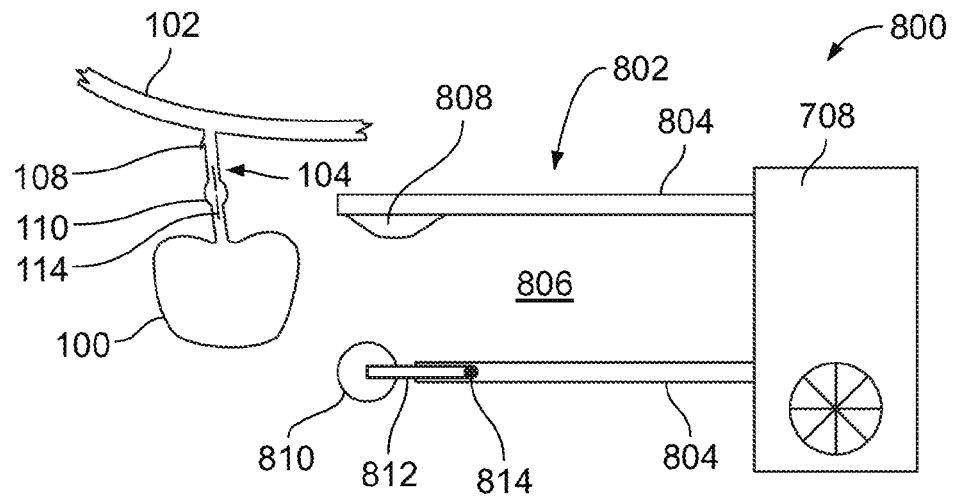
FIG. 8A illustrates a harvesting system configured to impart a twist to a fruit at an angle to the abscission axis of the fruit, in accordance with an example implementation.

FIG. 8A illustrates a harvesting device or system 800 configured to impart a twist to the fruit 100 at an angle to the abscission axis 114, in accordance with an example implementation. The harvesting system 800 includes the vacuum generating device 708 as depicted in FIG. 8A. The harvesting system 800 includes an end-effector 802. The end-effector 802 includes a tube 804 defining an internal longitudinal cylindrical cavity 806 within the tube 804.

The end-effector 802 also includes a projection 808 protruding from an internal peripheral surface of the tube 704 inward within the cylindrical cavity 806 toward a center of the tube 704. The projection 808 is disposed at a distal end of the tube 804 and is affixed thereto.

In an example, the projection 808 may be stiff and made of materials such as but not limited to hard plastic and may have a high coefficient of friction. A freely-rotatable wheel 810 is disposed on a diametrically-opposite side from the projection 808 at the distal end of the tube 804. The wheel 810 may be coupled to a support structure (e.g., a pole) 812. The support structure 812 is in turn coupled to the tube 804 at a pivot 814 to enable the wheel 810 and the support structure 812 to rotate or swivel relative to the tube 804 about the pivot 814. In examples, the pivot 814 may be spring-loaded and biased such that with no external force, the wheel 810 and support structure 812 may be maintained at a neutral un-rotated position shown in FIG. 8A.

Figure 8B:
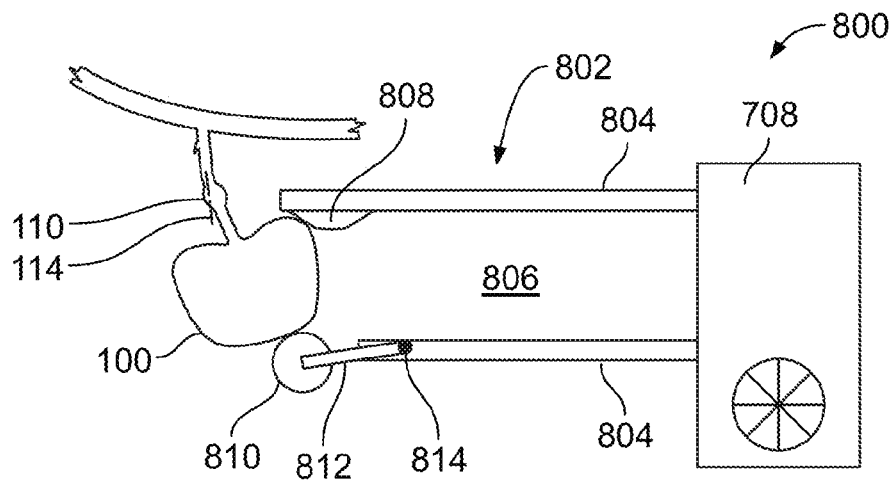
FIG. 8B illustrates operation of a harvesting system, in accordance with an example implementation.

FIG. 8B illustrates operation of the harvesting system 800, in accordance with an example implementation. As the end-effector 802 is placed in proximity of the fruit 100, and the vacuum generating device 708 is activated, the generated vacuum pulls the fruit 100 towards the tube 804. However, the projection 808, which may have a high coefficient of friction, may prevent the fruit 100 from moving inward into the cylindrical cavity 806 within the tube 804 unimpeded on this side.

On the diametrically-opposite side from the projection 808, the freely-rotatable wheel 810 along with the support structure 812 swivels out of the way (downward as illustrated in FIG. 8B). The difference in the forces experienced on opposite sides of the fruit 100 causes it to tilt at an angle to the abscission axis 114 as shown. FIG. 8B shows the abscission axis 114 in its original orientation to illustrate the angle that the fruit 100 makes relative to the abscission axis 114. The difference in the force experienced on opposite sides of the fruit 100 may facilitate the detachment of the fruit 100 at the abscission 110.

Figure 8C:
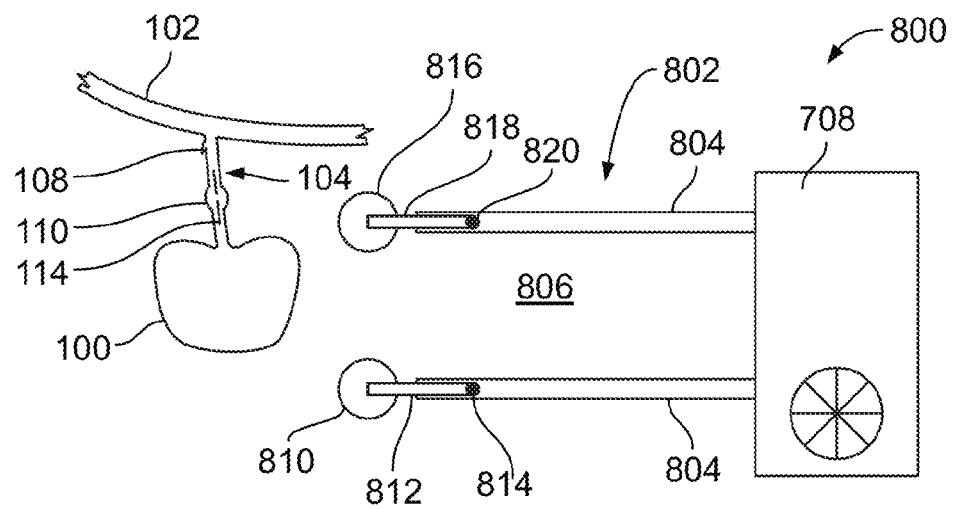
FIG. 8C illustrates a variation to the harvesting system shown in FIG. 8A, in accordance with an example implementation.
Figure 8D:
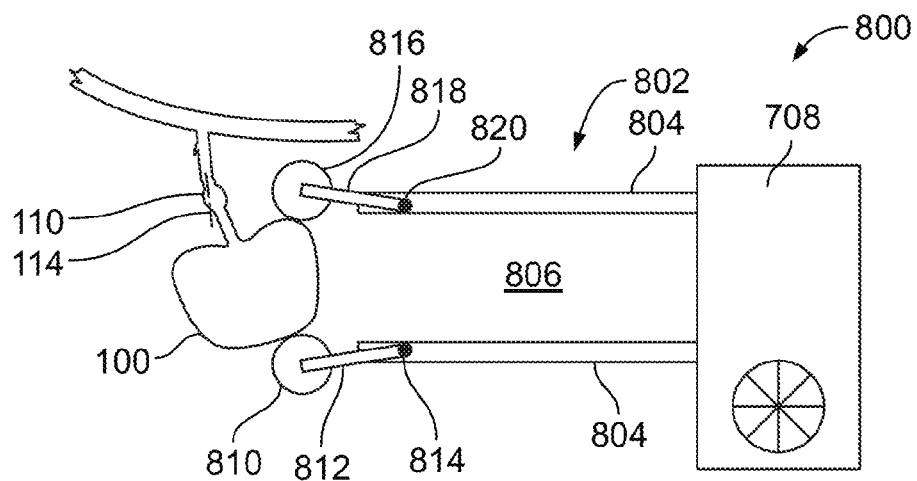
FIG. 8D illustrates operation of the harvesting system shown in FIG. 8C, in accordance with an example implementation.

FIG. 8C illustrates a variation to the harvesting system 800, and FIG. 8D Figure illustrates operation of the harvesting system 800 as shown in FIG. 8C, in accordance with an example implementation. In the configuration of FIG. 8C, the projection 808 is replaced by a wheel 816 coupled to a respective support structure 818, which is coupled to the tube 804 at a pivot 820.

As described earlier in reference to FIGS. 8A and 8B, the pivots 814 and 820 may be spring-loaded and biased such that with no external force, the wheels 810, 816 and their support structures 812, 818 may be maintained at a neutral un-rotated position shown in FIG. 8C. In examples, the two wheels 810, 816 may have different rolling resistances. For example, the wheel 810 may be freely-rotating, whereas the wheel 816 might not rotate as freely. In operation, as the vacuum pulls the fruit 100 into the tube 804, the differential rolling resistance of the two wheels 810, 816 may cause the fruit 100 to tilt at an angle to the abscission axis 114 as shown in FIG. 8D, thus facilitating detachment of the fruit 100 at the abscission 110.

Figure 8E:
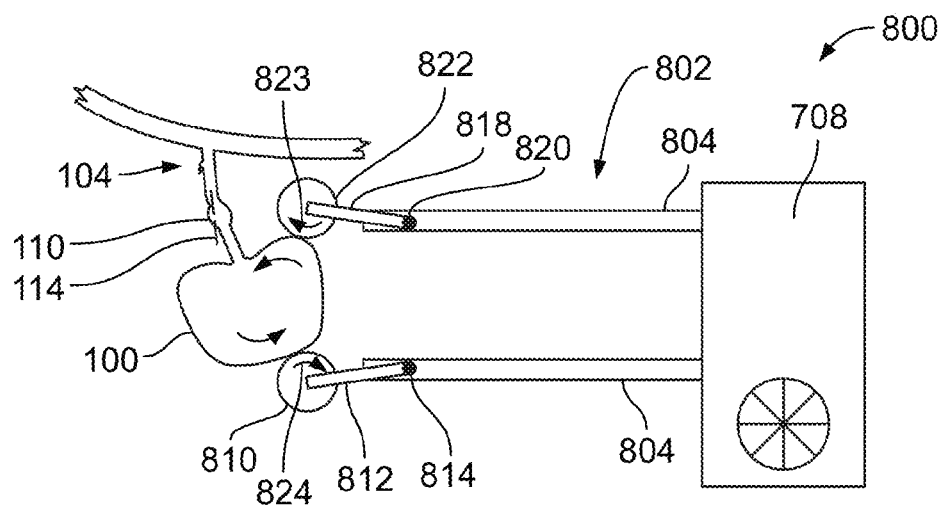
FIG. 8E illustrates another variation of the harvesting system shown in FIG. 8A, in accordance with an example implementation.

FIG. 8E illustrates another variation of the harvesting system 800, in accordance with an example implementation. The configuration of FIG. 8E is similar to the configuration in FIG. 8D, except that a driven wheel 822 replaces the wheel 816. For instance, a motor or other source of rotational motive force may be coupled to the wheel 822 to causes the wheel 822 to rotate in a particular direction represented by arrow 823 in FIG. 8E.

As the vacuum pulls the fruit 100 toward the tube 804, the fruit 100 engages both wheels 810 and 822. The driven wheel 822 causes the fruit 100 to twist, the friction between the fruit 100 and the wheel 810 causes the wheel 810 to rotate in an opposite rotational direction represented by arrow 824. This type of arrangement results in the fruit 100 being twisted relative to the abscission axis 114, thus facilitate detachment of the fruit 100 at the abscission 110 from the stem 104.

Figure 8F:
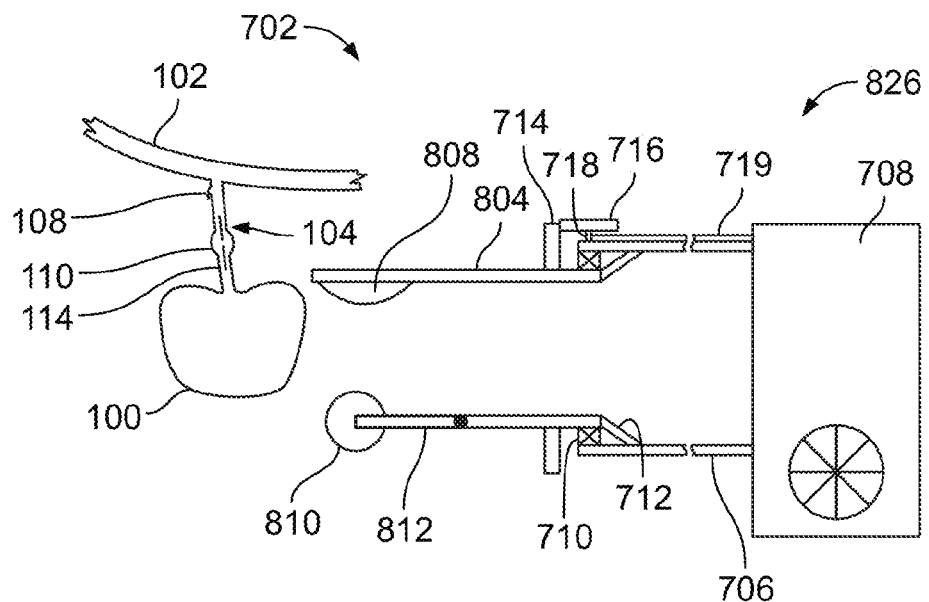
FIG. 8F illustrates a harvesting system combining features from the configuration of FIG. 7A with features from the configuration of FIG. 8A, in accordance with an example implementation.

In example implementations, features from the configuration of FIGS. 7A-7E can be combined with features from the configuration of FIGS. 8A-8E. For example, FIG. 8F illustrates a harvesting device or system 826 combining features from the configuration of FIG. 7A with features from the configuration of FIG. 8A, in accordance with an example implementation. In FIG. 8F, the tube 804 may be made to rotate similar to the tube 704. As explained before, various mechanisms may cause the tube 704 to rotate. Although FIG. 8F illustrates the projection 808 and the free-rotatable wheel 810 described with respect to FIG. 8A, any of the features described with respect to FIGS. 8B-8E could be used to impart a twist or rotation to the fruit 100.

In some cases, fruits grow in clusters such as the cluster 603 shown in FIGS. 6A-6B. In these cases, the angular orientation of each fruit may be different compared to other fruits in the cluster. The harvesting system 826 shown in FIG. 8F may facilitate plucking such fruits that grow in clusters because the harvesting system 826 may have the capability to rotate the tube 804 while also imparting a twist or rotation to the fruit, and could thus accommodate the various orientations of the fruits.

FIG. 8G illustrates a front view of the tube 804 configured to accommodate the various orientations of fruits growing in a cluster, in accordance with an example implementation. As shown in FIG. 8G, the flexible projections 722 may be coupled to the distal end of the tube 804 in a similar manner as described above with respect to FIG. 7A. In an example, the flexible projections 722 may include two pairs of electrodes 726A, 726B similar to the electrodes 726 described above. More than one pair of electrodes may be coupled to each flexible projection 722. Additionally, freely-rotatable wheels 810A and 810B similar to the wheel 810 described above may also be coupled to the distal end of the tube 804.

The electrodes 726A, 726B may be supplied with electricity such that when a specific pair, either of electrodes 726A, 726B, is turned on, electroadhesive force may be experienced by a body such as a fruit in contact with that pair. Depending on the orientation of the fruit, either the electrode pair 726A is turned on or the electrode pair 726B is turned on. Whichever pair is tuned on, the corresponding flexible projection 722 associated with that pair provides a high friction surface to the fruit.

The high friction surface experienced at a particular flexible projection 722 along with the low resistance experienced by the freely-rotating wheel 810A, or 810B opposite that particular flexible projection 722 causes the fruit to twist and rotate in a desired direction. For instance, if the electrode pair 726A is activated, then the fruit may twist or rotate at an angle to an axis 828 with the trajectory of the fruit following a path into the tube 804. Similarly, if the electrode pair 726B is activated, then the fruit may twist or rotate at an angle to an axis 830 with the trajectory of the fruit also following a path into the tube 804. Thus, by activating the electrode pair 726A or 726B, the various orientations of the fruits may be accommodated.

Several variations may be implemented to the configuration shown in FIG. 8G. In one example, if a given flexible projection 722 and a freely-rotating wheel 810 are considered a "set", more than two sets may be coupled to the tube 804. In another example, different voltages may be applied to respective electrode pairs 726A, 726B so that a varying amount of friction may be experienced by the fruit at each different flexible projection 722. With this configuration, two sets of flexible projection 722 and freely-rotating wheel 810 combinations may cause the fruit to twist or rotate at several angles depending on the voltage applied to each electrode pair.

In another example, driven wheels, such as the wheel 822 described above may replace the flexible projections 722 in FIG. 8G. By selectively driving a specific wheel or by driving the wheels differently such that varying amounts of rolling resistance may be experienced at the surface of each driven wheel, the fruit may twist at a desired angle. Different fruit orientations may thus be accommodated with one or a combination of the mechanisms described above.

FIG. 9A illustrates a perspective view of an end-effector 900, in accordance with an example implementation. The end-effector 900 could represent any of the end-effectors described above. The end-effector 900 may include a rigid tube 902 and a vacuum source (not shown) may be fluidly coupled to a proximal end of the rigid tube 902. The end-effector 900 may also include a nozzle 904 at a distal end of the rigid tube 902. The nozzle 904 is configured to shape and scale the airflow in front of and around the nozzle 904.

FIG. 9B illustrates a cross-sectional view of the end-effector 900 along plane A-A' shown in FIG. 9A, in accordance with an example implementation. The rigid tube 902 may couple into an intermediate tube 906 which may have a larger diameter. The end-effector 900 may include vacuum ports 908 disposed near a junction of the rigid tube 902 and the intermediate tube 906. Although four vacuum ports are shown, fewer or more vacuum ports may be used.

As an example to illustrate dimensions of an example end-effector 900, a length "L" of may be about 18 inches, diameter D1 may be about 5 inches, and diameter D2 may be about 7 inches. These dimensions are examples for illustration only, and other dimensions are possible based on size of a fruit to be plucked.

Figure 9C:
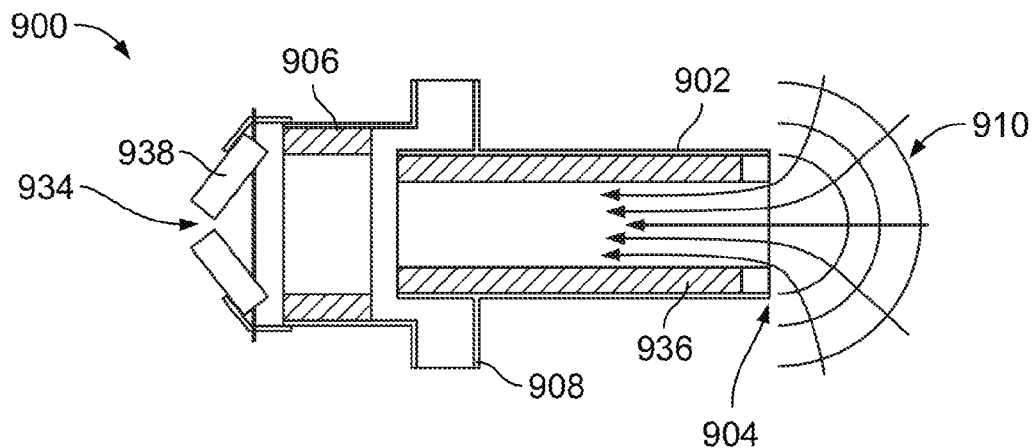
FIG. 9C illustrates a schematic diagram showing airflow induced within and around a rigid tube, in accordance with an example implementation.

FIG. 9C illustrates a schematic diagram showing airflow induced within and around the rigid tube 902, in accordance with an example implementation. When the vacuum source is activated, a region of 'ingestion' defining a flow field 910 is created where the airflow increases with proximity to the nozzle 904 due to the restriction created at an entrance of the nozzle 904. A distal portion of the flow field 910 is capable of inducing forces on a fruit sufficient to move the fruit closer toward the nozzle 904, at which point the fruit moves into a region of higher air flow and substantially higher forces sufficient to separate the fruit from the plant or tree.

Figure 9D:
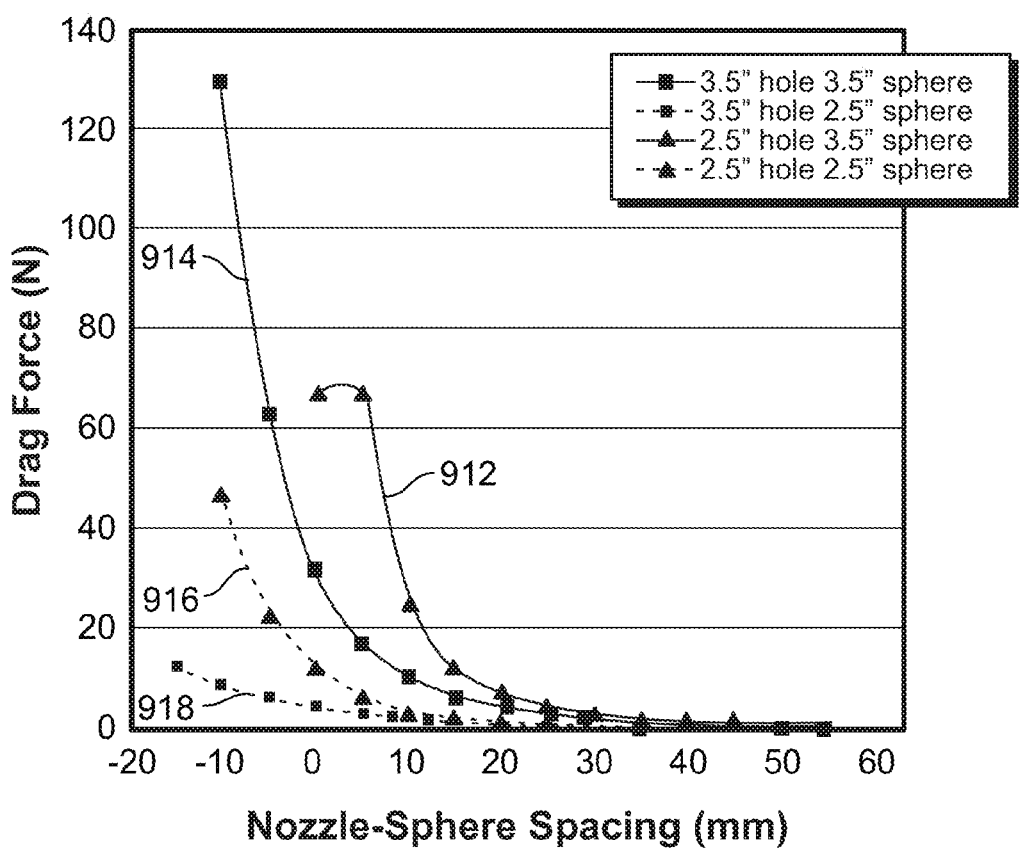
FIG. 9D illustrates experimental data that relate spacing of a nozzle from a fruit to a drag force on test spheres of different diameters using different nozzle orifice sizes, in accordance with an example implementation.

FIG. 9D illustrates experimental data that relate spacing of the nozzle 904 from the fruit to a drag force on test spheres of different diameters using different nozzle hole sizes. The x-axis is labelled "Nozzle-Sphere Spacing" and refers to a spacing between a front surface of the nozzle 904 and a front most point on a test sphere representing a fruit. The y-axis represents the drag force in Newton (N).

Line 912 represents variation of the drag force with the nozzle-sphere spacing when the hole of the nozzle 904 is 3.5 inches and the sphere is 3.5 inches. Line 914 represents variation of the drag force with the nozzle-sphere spacing when the hole of the nozzle 904 is 3.5 inches and the sphere is 2.5 inches. Line 916 represents variation of the drag force with the nozzle-sphere spacing when the hole of the nozzle 904 is 2.5 inches and the sphere is 3.5 inches. Line 918 plots variation of the drag force with the nozzle-sphere spacing when the hole of the nozzle is 2.5 inches and the sphere is 2.5 inches.

As can be concluded from FIG. 9D, generally, the larger the hole of the nozzle 904 the higher the drag force for the same size sphere. Similarly, the larger the sphere size, the higher the drag force for the same size of the hole of the nozzle 904.

In examples, the nozzle 904 may be constructed from a rigid material, a flexible material, or a combination of both. If the nozzle 904 is constructed of a flexible material, the rigid tube 902 may be made sufficiently large such that the fruit may pass through both the nozzle 904 and the rigid tube 902. If the nozzle 904 is constructed of a rigid material, the nozzle hole size may be actively or passively modified to control airflow as well as allow the fruit to pass through the rigid rube 902. Modifying the hole size of the nozzle 904 may be achieved using any of several techniques.

Figure 9E:
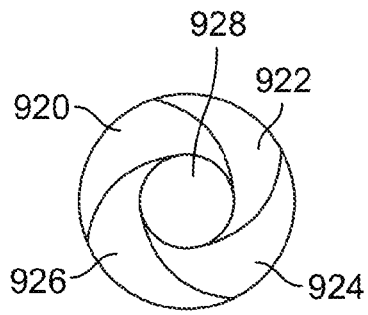
FIG. 9E illustrates an iris opening mechanism with a large iris opening, in accordance with an example implementation.
Figure 9F:
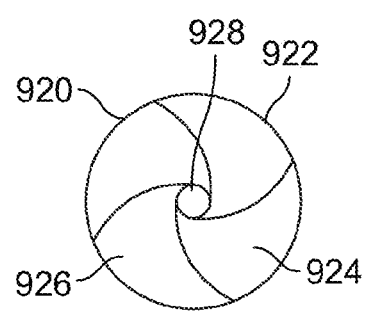
FIG. 9F illustrates the iris opening mechanism shown in FIG. 9A with a small iris opening, in accordance with an example implementation.

In one example, an iris opening mechanism may be used. FIG. 9E illustrates an iris opening mechanism with a large iris opening, and FIG. 9F illustrates the iris opening mechanism with a small iris opening, in accordance with an example implementation. As shown in FIGS. 9E-9F, multiple plates 920, 922, 924, and 926 may be arranged as shown so that the size of opening 928 may be adjusted. FIG. 9E illustrates a large opening 928 compared to FIG. 9F. Motors or other actuation mechanisms may be mounted on the body of the end-effector 900 so that the position of the plates 920-926, and thus the size of the opening 928 may be adjusted.

In order to free the end-effector 900 to immediately perform another "pick" operation, rather than placing the fruit at another location then performing the "pick" operation, a conveyor system may be coupled to the proximal end of the rigid tube 902. This is advantageous as the impact of the "place" operation on the efficiency of harvesting may be reduced.

Further, as the fruit traverses the vacuum environment of the end-effector 900, it may be bruised due to potential high speeds of the fruit due to the vacuum pressure. Therefore, during conveyance of the fruit to a bin filler (e.g., the bin filler 220), it may be desirable to reduce the speed of the fruit by removing the fruit from the vacuum environment as well as providing ways to decelerate the fruit. Decelerating the fruit to reduce its velocity may reduce the likelihood of bruising the fruit as it is delivered to the bin filler. Decelerating the fruit to a safe speed can occur either before or after the fruit is removed from the vacuum environment. Deceleration mechanisms can be integrated directly to the rigid tube 902, or somewhere between the rigid tube 902 and the bin filler.

Figure 9G:
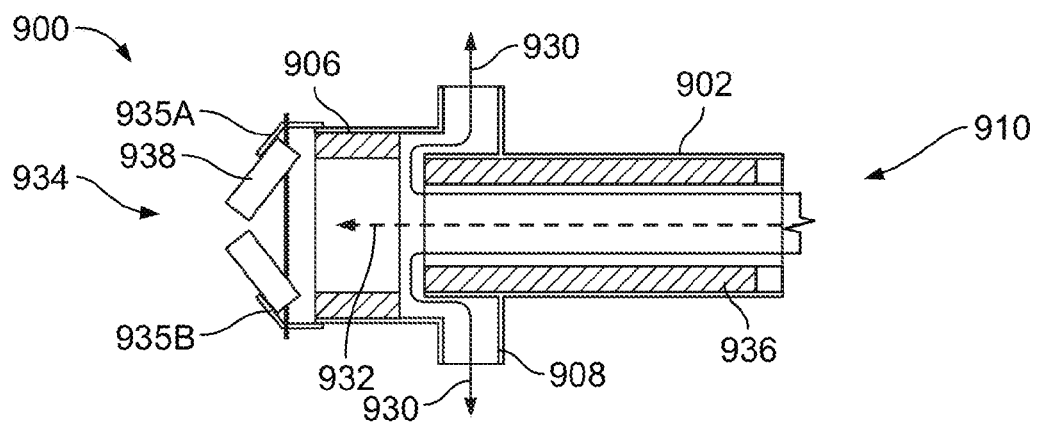
FIG. 9G illustrates a cross-sectional view of the end-effector shown in FIG. 9A, in accordance with an example implementation.

FIG. 9G illustrates a cross-sectional view of the end-effector 900, in accordance with an example implementation. The rigid tube 902 allows a path for the airflow represented by arrows 930 and also provides a path represented by arrow 932 for the fruit.

The end-effector 900 is further configured to include a vacuum escape outlet mechanism or device. Particularly, the end-effector 900 may have a check valve-like vacuum-escape or outlet mechanism 934 having two flaps or doors 935A and 935B that trap or contain the vacuum environment to within the tubes 902 and 906. Once the fruit traverses through or passes beyond the doors or flaps 935A-935B, the fruit is no longer subjected to vacuum pressure.

The doors 935A-935B open to form an opening therebetween and allow the fruit to pass therethrough, but otherwise remain closed. An actuator, passive springs, or the force resulting from the vacuum environment within the tubes 902, 906 could be used to maintain the doors 935A-935B closed in the absence of fruit. As such, the doors 935A-935B could be spring-loaded. The momentum of the fruit can force the doors 935A-935B open to allow the fruit to pass therethrough, and spring forces could cause them to close again upon passage of the fruit. In other examples, an actuator can be used to actively open the doors 935A-935B to allow the fruit to pass.

In the case that the momentum of the fruit is used to passively open the doors 935A-935B, the end-effector 900 is configured such that the fruit has enough momentum to overcome the force applied to maintain the doors 935A-935B in the closed position. Because momentum increases for a given mass by increasing velocity, it may be desirable to accelerate the fruit to a sufficiently high speed so that it has the momentum to open and exit from the doors 935A-935B.

Restricting the airflow around the fruit as it passes through the rigid tube 902 can accomplish the desired speed. Specifically, increasing the vacuum pressure on the fruit may cause increased acceleration and speed. This restriction can be implemented by having a passively or actively adjustable liner 936 inside the rigid tube 902. The liner 936 could also contain and/or operate as a padding. The padding may reduce the likelihood of the fruit being damaged as it travels along the length of the rigid tube 902.

It may also be desirable to minimize the speed of the fruit while ensuring the fruit has sufficient momentum to pass through the doors 935A-935B. As such, the closing force applied to the doors 935A-935B may be reduced, such as by minimizing the mechanical spring force or the force of the vacuum pressure on the doors 935A-935B. In another example, the spring force and vacuum force can be combined to create a balanced force on the doors 935A-935B to maintain a closed position with a small force that can be overcome by the momentum of the fruit.

The intermediate tube 906 has a larger diameter compared to the rigid tube 902. Additionally, when the doors 935A-935B are closed, airflow passes to the vacuum ports 908 on the sides of the end-effector 900 as indicated by the arrows 930, and thus the cavity within the intermediate tube 906 may have reduced or negligible airflow when the doors 935A-935B are closed. This construction enables the fruit to move in an approximately uninterrupted path represented by the arrow 932 to the outlet mechanism 934. As a result, the axial length of the path of the fruit in vacuum is reduced and the total length of the end-effector 900 may be reduced.

Further, the doors 935A-935B may be padded with pads 938. The pads 938 may reduce the likelihood of damaging the fruit as the fruit impacts the doors 935A-935B. Further, the pads 938 may be configured to decelerate the fruit as the fruit leaves the intermediate tube 906 and impacts the pads 938. With this configuration, deceleration of the fruit is achieved passively via impact with the pads 938. In an example, the pads 938 may be made of materials that have viscous and elastic properties such as but not limited to memory foam, or other visco-elastic or inelastic materials having damping characteristics. Such materials may be chosen such that upon impact, the speed of the fruit may be reduced with minimal or no rebound.

In examples, as the fruit is being plucked, debris such as twigs may be vacuumed into the rigid tube 902 along with the fruit. As the twigs are of relatively smaller mass, they may follow the path of the arrow 930 and get stuck at the junction of the intermediate tube 906 and the rigid tube 902 where the airflow makes a U-turn before exiting at the vacuum port 908. Over time, the stuck twigs may reduce the effectiveness of the vacuum.

To avoid this, the end-effector 900 may be configured to have a twig cutter. The twig cutter may include, for example, two wheels, one of which rotates with respect to the other. Both wheels may have opposing blades formed within the wheels. As the wheels rotate with respect to the other, the blades cut the twigs reducing the obstruction.

Figure 9H:
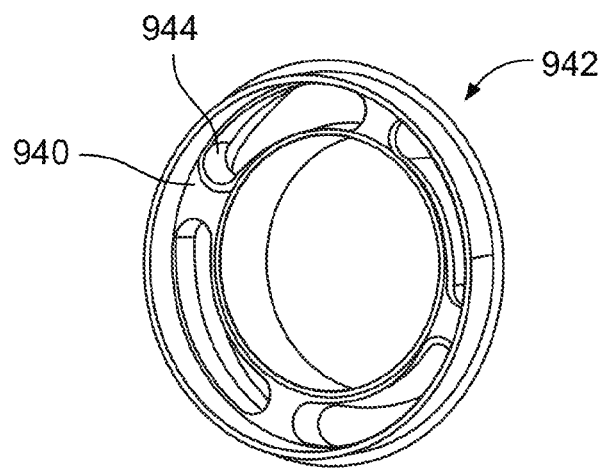
FIG. 9H illustrates wheels for twig cutting, in accordance with an example implementation.

FIG. 9H illustrates wheels 940 and 942 for twig cutting, in accordance with an example implementation. The wheel 940 can rotate with respect to the wheel 942, and each wheel may have multiple blades cut into its body. For instance the wheel 940 may have a blade 944.

Figure 9I:
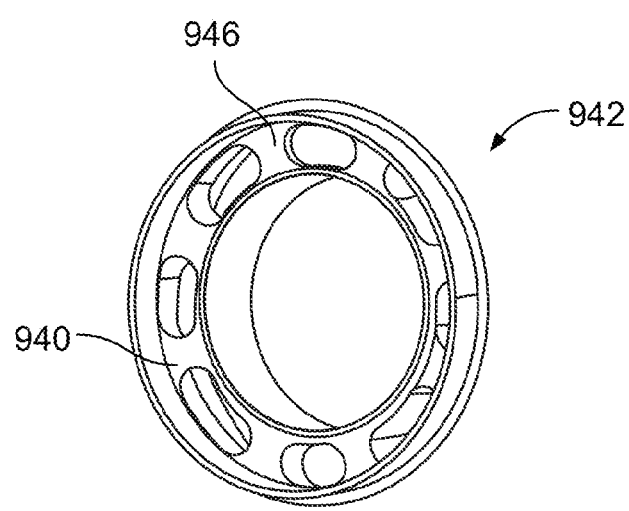
FIG. 9I illustrates a wheel in a rotated position relative to its position depicted in FIG. 9H, in accordance with an example implementation.

FIG. 9I illustrates the wheel 942 in a rotated position relative to its position depicted in FIG. 9H, in accordance with an example implementation. The blades cut into the wheel 942 are visible through the feature cut into the wheel 940. For example, blade 946 on the wheel 942 is visible. The blades may include sharp edges to facilitate cutting the twigs.

Figure 9J:
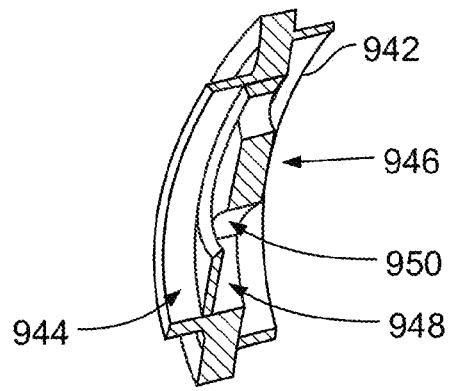
FIG. 9J illustrates a section of a wheel and a section of a blade having a sharp edge, in accordance with an example implementation.

FIG. 9J illustrates a section of the wheel 940 and a section of the blade 944 having a sharp edge 948, in accordance with an example implementation. FIG. 9J also shows a section of the wheel 942 and its blade 946 having a respective sharp edge 950. With this configuration, if twigs get stuck at the intersection of the rigid tube 902 and the intermediate tube 906, by rotating one of the wheels 940, 942 of the twig cutter, the twigs may be cut into smaller pieces. As such, reduction in vacuum force due to clogged airways may be alleviated.

In an example, wheel rotation may be achieved by a motor (not shown). In another example, wheel rotation may be achieved by coupling the wheels 940, 942 or at least one of them to a turbine through a gearbox.

Figure 9K:
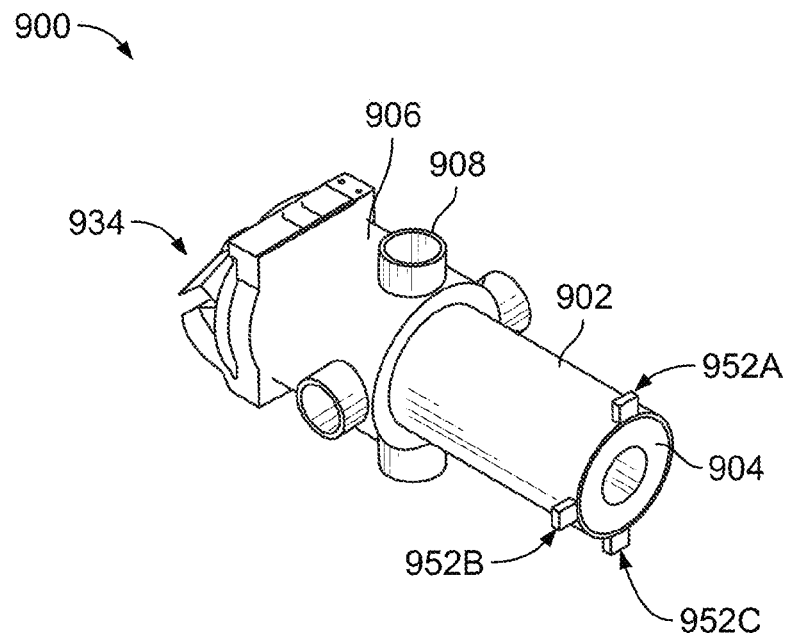
FIG. 9K illustrates example locations where sensors may be coupled to an end-effector, in accordance with an example implementation.

In examples, sensors, cameras and other electronic components, generally referred to as 'sensors' may be installed at various locations including but not limited to, along the exterior and the interior of the end-effector 900. FIG. 9K illustrates example locations 952A, 952B, and 952C where sensors may be coupled to the end-effector 900, in accordance with an example implementation. Other locations are not excluded.

The sensors may be used to enhance the performance of the robotic system 200 and the end-effector 900. The sensors may also be part of the control system 400 and particularly the sensors 404. As examples, the sensors mounted to the end-effector 900 may include one or multiple cameras, one or multiple proximity sensors, one or multiple contact sensors, one or multiple pressure sensors, and one or multiple light or structured light sources.

Cameras may be used for accurate positioning of the end-effector 900. For instance, the cameras may be part of a vision system configured to communicate with the controller 402 to process images captured by the cameras, perform object recognition, and compute the location of the recognized fruits and send control signals to the actuation mechanism 405 so that the end-effector 406, 900 can be positioned appropriately near the fruits, one fruit at a time.

The controller 402 may be configured to pick fruits that are adequately ripe and apparently defect free, while leaving others. Cameras may provide information to the controller 402 that can be used to determine whether a particular fruit is ripe for plucking. Cameras may also be placed internal to the end-effector 900 in order to capture visual information about multiple sides of the fruits as they pass through the end-effector 900 to evaluate the quality of the fruit.

In examples, as mentioned above the robotic system 200 may have multiple end-effectors, and each end-effector can be positioned independently and automatically. A proximity sensor may provide information about the proximity of parts of the tree structure (e.g. branches, trunks, trellis wires, trellis posts, etc.) or the fruits themselves to an end-effector. The proximity sensor may also provide information about the proximity of objects such as but not limited to people. The Information may be used to confirm the estimated location of fruits, as well as avoid objects other than fruits. The proximity sensor may also provide information about the location and speed of fruits within the end-effector 900. The proximity sensor may include any of various types such as but not limited to optical, magnetic, inductive, and acoustic sensor.

The sensors may include a contact sensor configured to provide information about the alignment of the end-effector 900 to the fruit upon contact, or may provide information about the contact of the end-effector 900 with an object other than the intended fruit. Contact sensors may generate a change in electrical current or voltage as the result of displacing and or compressing a physical material. Contact sensor types may include capacitive, inductive, resistive, or optical sensors. The information may be used by the controller 402 to adjust the position of the end-effector 900 during picking.

The sensors may further include a pressure sensor configured to provide information about the change in pressure in the vacuum environment. They may be placed inside the end-effector 900 so as to sense the internal pressure within the end-effector 900 without contacting the picked fruits. The information may be used to determine when a fruit has been successfully picked. Pressure sensors may be capacitive, for example.

Other sensor types could be used as well. For example, hyperspectral imagers, x-ray, etc. could be used to enable fruit detection through leaves, or the evaluation of fruit quality based upon internal fruit anatomy.

Various other end-effector configurations and features could be implemented. For example, rather than integrating the deceleration and outlet mechanism into the end-effector 900, other components could be coupled to the end-effector to implement the deceleration and outlet mechanism.

Figure 10:
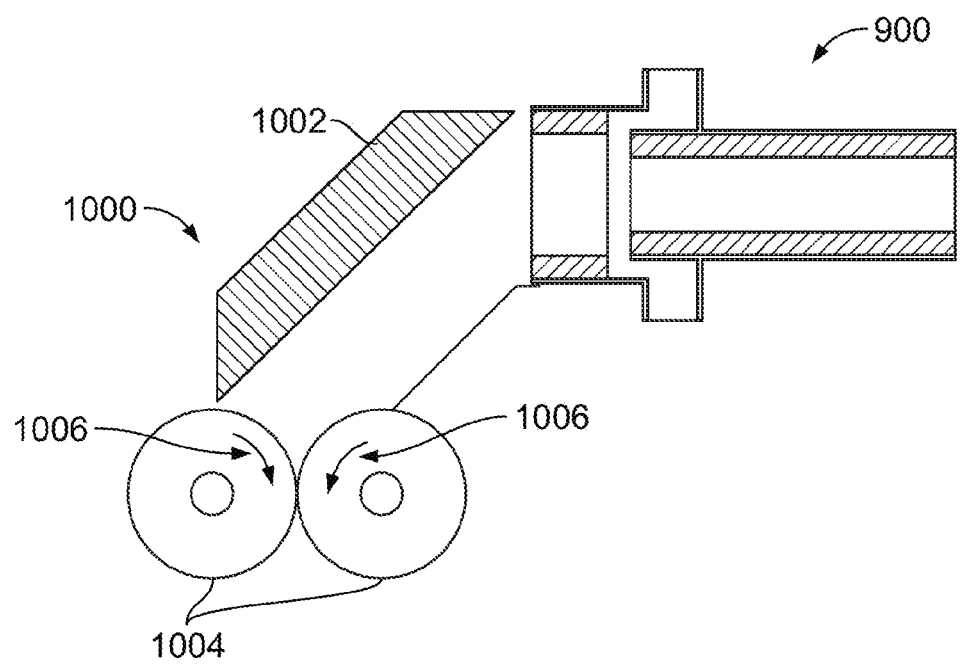
FIG. 10 illustrates a padded conduit coupled to a proximal end of an end-effector, in accordance with an example implementation.

FIG. 10 illustrates a padded conduit 1000 coupled to a proximal end of the end-effector 900, in accordance with an example implementation. As mentioned above, once the fruit escapes the vacuum environment, it continues to move with a velocity consistent with its remaining momentum. Decelerating the fruit to further reduce its velocity may reduce the likelihood of bruising the fruit as it is delivered to the bin filler.

In examples, the conduit 1000 may be lined with a pad 1002 configured to decelerate the fruit as the fruit leaves the intermediate tube 906 and impacts the pad 1002. Two wheels 1004 may be disposed at an end of the conduit 1000. Centers of rotations of the wheels 1004 may be mounted on a spring (not shown) to allow relative lateral movement therebetween.

The wheels 1004 may be driven as shown in the direction of arrows 1006 by motors (not shown). Thus, as the fruit impacts the pad 1002 and falls onto the wheels, the springs allow the wheels 1004 to part, thus allowing the fruit to pass through. The spring force may be adjusted such that the force is enough to slow the fruit down without clasping it tightly to preclude bruising.

With this configuration, deceleration of the fruit is achieved passively via impact with the pad 1002. In an example, the pad 1002 may be made of materials that have viscous and elastic properties such as but not limited to memory foam, or other visco-elastic or inelastic materials having damping characteristics. Such materials may be chosen such that upon impact, the speed of the fruit may be reduced with minimal or no rebound. Various other deceleration mechanisms could be used as described next.

Figure 11A:
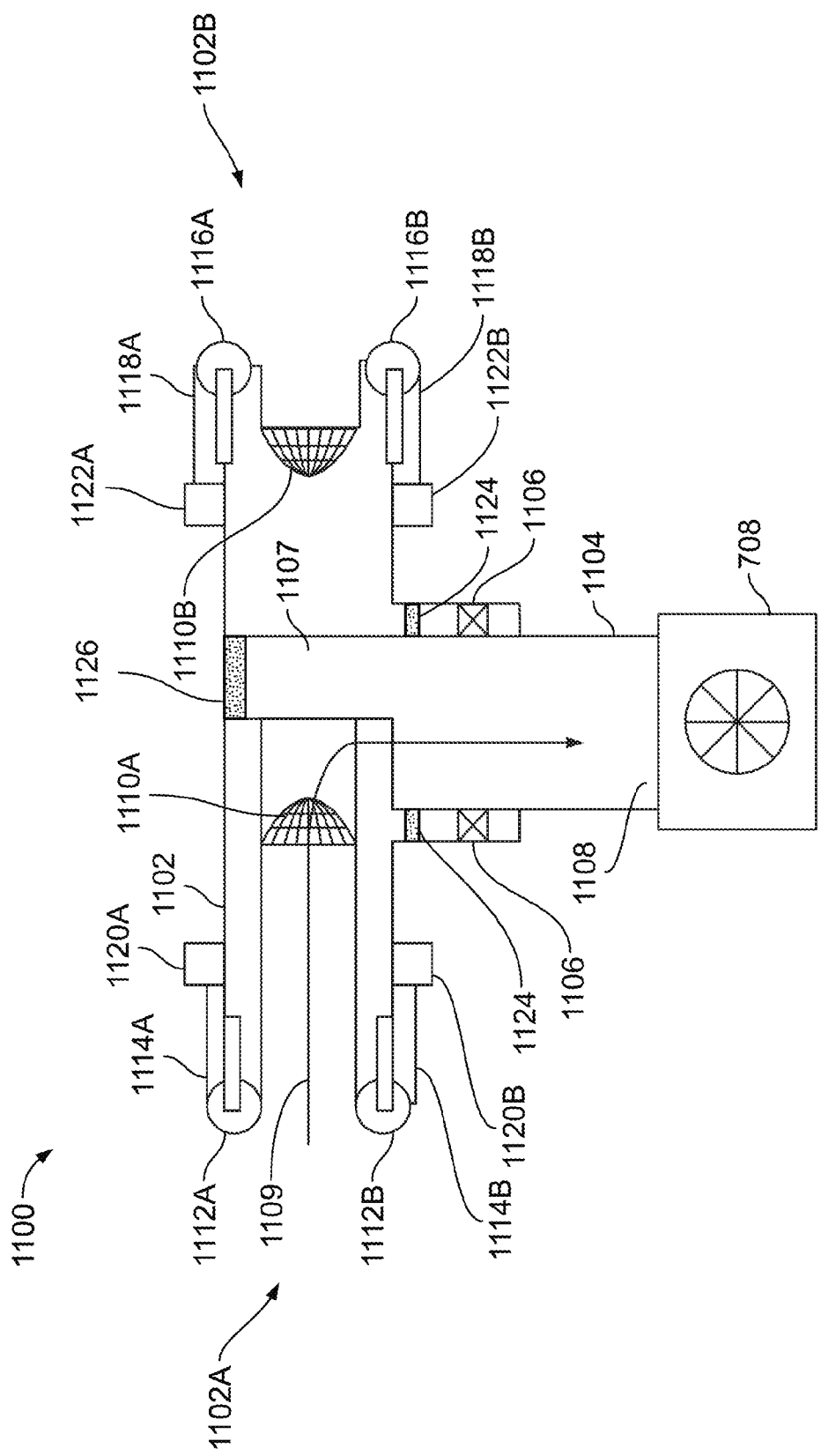
FIG. 11A illustrates a harvesting system with an end-effector having a T-shaped outer tube, in accordance with an example implementation.

FIG. 11A illustrates a harvesting device or system with an end-effector 1100 having a T-shaped outer tube 1102, in accordance with an example implementation. As shown in FIG. 11A, ends of the T-shaped tube 1102 are labeled 1102A and 1102B. The outer tube 1102 may be configured to rotate around an inner tube 1104. Bearings 1106 mounted between the inner tube 1104 and the outer tube 1102 may facilitate relative rotation therebetween.

The inner tube 1104 around which the outer tube 1102 rotates may include the vacuum generating device 708 coupled at one end thereof. The other end of the inner tube 1104 may open into the outer tube 1102 as described below.

Figure 11B:
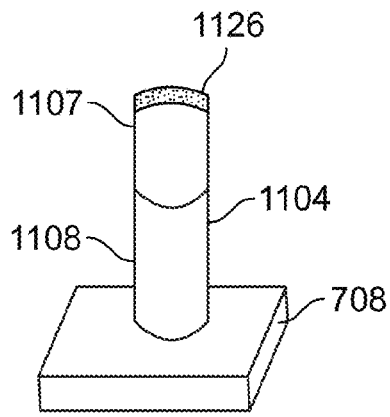
FIG. 11B illustrates a front perspective view of an inner tube, in accordance with an example implementation.
Figure 11C:
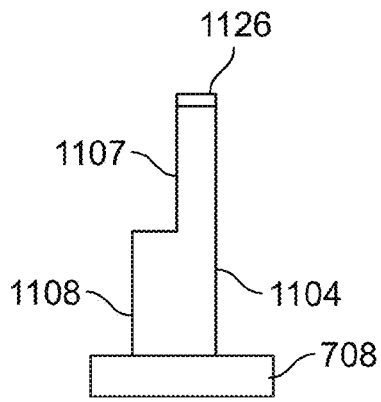
FIG. 11C illustrates a side view of the inner tube shown in FIG. 11B, in accordance with an example implementation.

FIG. 11B illustrates a front perspective view of the inner tube 1104, and FIG. 11C illustrates a side view of the inner tube 1104, in accordance with an example implementation. As shown, the inner tube 1104 may be described as a half cylinder 1107 coupled to a top of a full cylinder 1108.

Figure 11D:
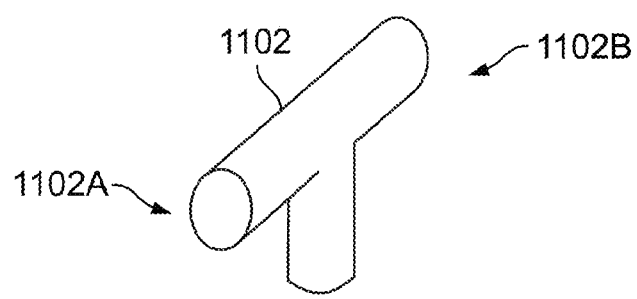
FIG. 11D illustrates a perspective view of an outer tube, in accordance with an example implementation.

FIG. 11D illustrates a perspective view of the outer tube 1102, in accordance with an example implementation. The outer tube 1102 is shown in FIG. 11D without other components of the end-effector 1100 shown in FIG. 11A. When either of the ends 1102A or 1102B aligns with the half cylinder 1107 such that the half cylinder 1107 opens into one of the ends 1102A, 1102B, that end is subjected to a vacuum. Thus, referring back to FIG. 11A, the half cylinder 1107 is illustrated opening into the end 1102A and the path of the vacuum is illustrated by arrow 1109. The wall of the half cylinder 1107 may cut off the vacuum from reaching the opposite end of the T-shaped tube 1102, i.e., the end 1102B, which might not be subjected to vacuum in this case.

Each end 1102A, 1102B of the T-shaped outer tube 1102 may be coupled to a respective catch-net 1110A and 1110B. The catch-nets 1110A-1110B may couple to pulleys configured to control the position of the catch-nets 1110A-1110B inside the outer tube 1102. For instance, the catch-net 1110A may couple to pulleys 1112A and 1112B by soft strings or cables 1114A and 1114B. Similarly the catch-net 1110B may couple to pulleys 1116A and 1116B by soft strings or cables 1118A and 1118B. The soft cables or strings 1114A, 1114B, 1118A and 1118B may couple to motors with a take up mechanism. For instance, motor and the take up mechanisms 1120A and 1120B couple to the strings 1114A and 1114B, respectively, whereas motor and the take up mechanisms 1122A and 1122B couple to the strings 1118A and 1118B.

In operation, the catch-nets 1110A, 1110B alternate between catching or capturing the fruit and releasing the fruit. For example, referring to the configuration of FIG. 11A, the end 1102A of the outer tube 1102 is subjected to vacuum due to alignment of the end 1102A to the open face of the half-cylinder 1107. For reference, this position of the outer tube 1102 may be called the starting position.

As the fruit detaches from the tree, it may travel into the outer tube 1102 and may be captured by the catch-net 1110A. During this time, as stated before, the outer tube 1102 may be rotating around the inner tube 1104. As the outer tube 1102 rotates and the opening of the end 1102A begins to get occluded by the wall of the half-cylinder 1107, the vacuum pressure decreases.

When the ends 1102A and 1102B are in diametrically opposite locations from their starting positions, the end 1102A may be open to the atmosphere while the end 1102B may now be subjected to the vacuum generated by the vacuum generating device 708. Motors 1120A and 1120B may now be activated to eject the fruit from the catch-net 1110A by bringing the fruit forward towards the opening 1102A of the outer tube 1102. Meanwhile another fruit may be plucked by the end 1102B due to the vacuum existing thereat. Each end 1102A, 1102B of the outer tube 1102 may thus alternatively pluck the fruit and eject the fruit.

The catch-nets 1110A-1110B could also be used to decelerate the fruit. For example, the catch-nets 1110A-1110B could be made from an inelastic material supported by or attached to a damper, a passive spring, or any dissipative element. When the fruit impacts the catch-net 1110A, 1110B, the catch-net 1110A, 1110B assumes the velocity of the fruit and the dissipative mechanism slows both the catch-net 1110A, 1110B and the fruit. In examples, the catch-nets 1110A-1110B could be padded or lined with a padding to decelerate the fruit.

In examples, the end-effector 1100 may include seals 1124 and 1126 to reduce unwanted dissipation of vacuum. Further, the end-effector 1100 may include mechanisms to twist and rotate the fruit. For example, the pulleys 1112A, 1112B, 1116A, and 1116B may include driven wheels similar to the driven wheel 822 shown in FIG. 8E. In addition, a set a flexible projection with electrodes and a freely rotating wheel such as illustrated in FIG. 8G may couple to the ends 1102A and 1102B orthogonal to the axis joining the pulleys 1112A, 1112B and the axis joining the pulleys 1116A, 1116B.

With the harvesting system described in FIGS. 11A-11D, the speed at which fruits may be plucked and disposed of could be increased. Additional features could be added to an end-effector to make further steps of the harvesting process more efficient. As an example, the end-effector may be combined with a mechanism to transport the fruit to a conveyance system.

Figure 12A:
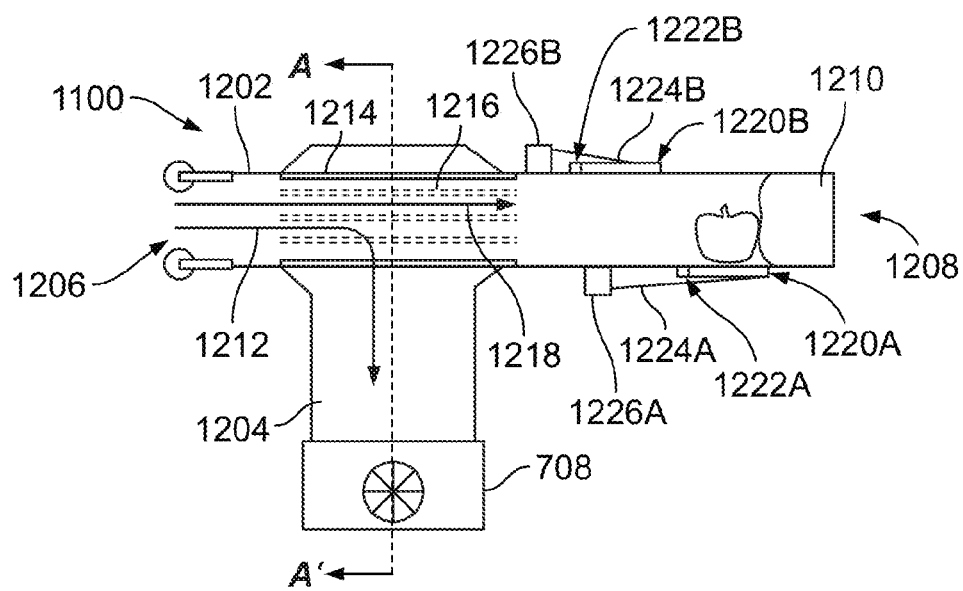
FIG. 12A illustrates combining an end-effector with a transport mechanism, in accordance with an example implementation.

FIG. 12A illustrates combining an end-effector 1200 with a transport mechanism, in accordance with an example implementation. The end-effector 1200 includes two tubes 1202 and 1204 that generally provide the overall structure for the end-effector 1200. The tubes 1202, 1204 may couple generally perpendicular to each other as shown in FIG. 12A. However, other angles between the two tubes 1202, 1204 are possible. In examples, one end 1206 of the tube 1202 may be used to detach the fruit from the tree, while the other end 1208 may have a fruit arrestor 1210. Operation of the fruit arrester 1210 is described below.

With the fruit arrestor 1210 disposed at the end 1208, the end 1206 is open to the atmosphere. The path of airflow generated or induced by the vacuum generating device 708 may be predominantly along arrows 1212.

To prevent the fruit from falling into the tube 1204, a barrel 1214 with slit holes 1216 may be placed at the T-junction between the tube 1202 and the tube 1204. The slit holes 1216 are shown by dashed lines in FIG. 12A. The barrel 1214 prevents the fruit from falling into the tube 1204 and guides the fruit to the other end 1208 of the tube 1202, while the slit holes 1216 allow air to flow down the tube 1204 along the arrow 1212.

Figure 12B:
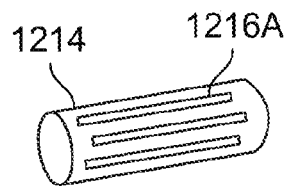
FIG. 12B illustrates a barrel with slit holes having a first shape, in accordance with an example implementation.
Figure 12C:
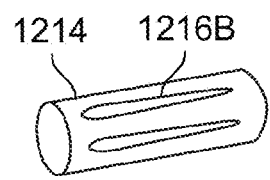
FIG. 12C illustrates a barrel with slit holes having a second shape, in accordance with an example implementation.

FIG. 12B illustrates the barrel 1214 with slit holes 1216A having a first shape, and FIG. 12C illustrates the barrel 1214 with slit holes 1216B having a second shape, in accordance with example implementation. Other shapes and configurations of the slit holes 1216 are possible as well.

Figure 12D:
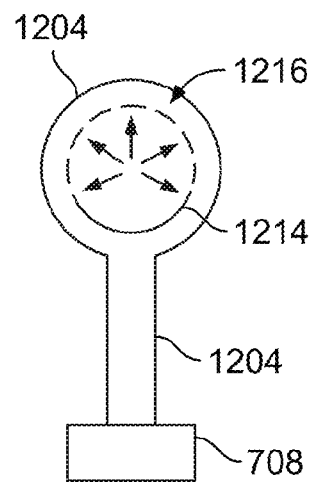
FIG. 12D illustrates a cross-sectional view of an end-effector along plane A-A' shown in FIG. 12A, in accordance with an example implementation.

To aid the passage of the fruit through the barrel 1214, the tube 1204 may surround the tube 1202. FIG. 12D illustrates a cross-sectional view of the end-effector 1200 along plane A-A' shown in FIG. 12A, in accordance with an example implementation. As shown in FIG. 12D, the barrel 1214 is surrounded by the tube 1204. Also shown in FIG. 12D, small arrows inside the cross-sectional view of the barrel 1214 indicate air flow from the inside of the barrel 1214 toward the tube 1204.

Referring back to FIG. 12A, the bottom of the barrel 1214 might not have the slit holes. As such, the forces on the fruit may be such that the fruit is not dragged toward the tube 1204. Rather, the fruit might experience a net upward force due to the vacuum. The upward force may balance or at least reduce the gravitational force on the fruit and facilitate passage of the fruit through the barrel 1214 toward the end 1208 of the tube 1202. Thus, once the fruit detaches front the tree, it may travel along arrow 1218 shown in FIG. 12A toward the end 1208.

As discussed above, it may be desirable to decelerate the fruit to prevent damaging or bruising the fruit. Several techniques may be implemented to decelerate the fruit as discussed above. As another example technique, the end-effector 1200 includes the fruit arrestor 1210 disposed at the end 1208 and configured to decelerate the fruit. The fruit arrester 1210 may include a soft balloon or soft net or other similar soft material that can deform when impacted by the fruit to absorb kinetic energy of the fruit and decelerate it. Once the fruit has decelerated or stopped moving, the end-effector 1200 may then be configured to remove the fruit from within the tube 1202 for transportation to the conveyance mechanism or bin filling system.

Figure 12E:
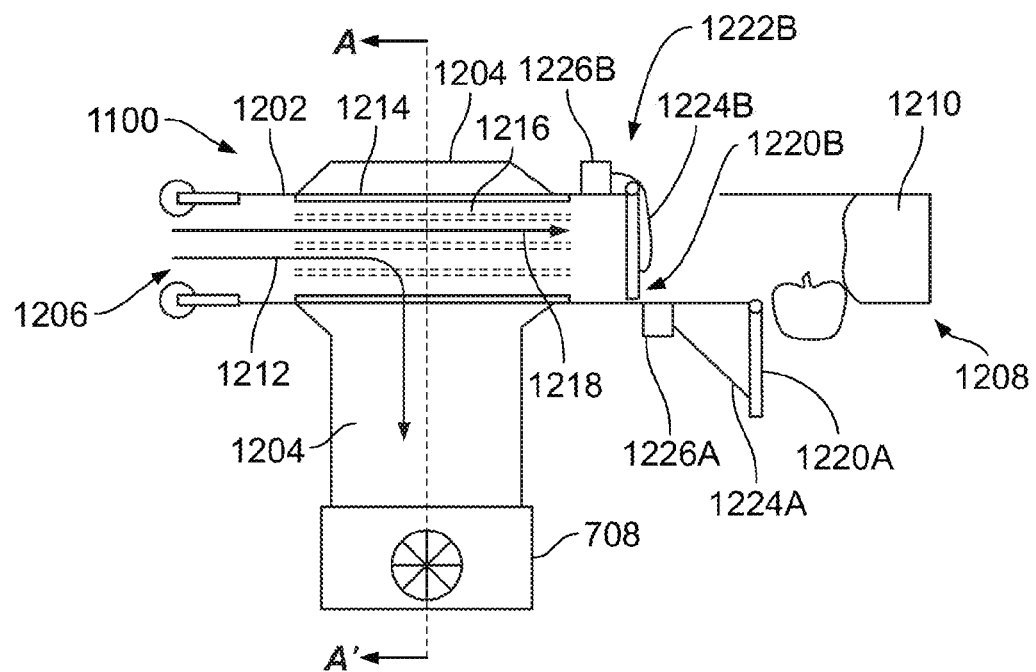
FIG. 12E illustrates removal of a fruit from a tube, in accordance with an example implementation.

FIG. 12E illustrates removal of the fruit from the tube 1202, in accordance with an example implementation. As shown in FIGS. 12A and 12E, the end-effector 1200 may include two valves or gates 1220A and 1220B. The valve 1220A may be coupled to the tube 1202 via a hinged joint 1222A and the valve 1220B may couple to the tube 1202 via a hinged joint 1222B.

Additionally, the valve 1220A may couple via a link mechanism 1224A to a motor 1226A (e.g., a stepper motor), and the valve 1220B may couple via a cable or string 1224B to a motor 1226B. The valve 1220A may couple by the link mechanism 1224A as opposed to a cable or a string because the link mechanism 1224A may push the valve 1220A up against gravity to shut the valve 1220A. In contrast, gravity may cause the valve 1220B to open and tension on the cable 1224B may be sufficient to close the valve 1220B. Thus, in general, control of the link mechanism 1224A and the string or cable 1224B controls positions of the valves 1220A and 1220B, respectively.

FIG. 12E illustrates how the fruit may be removed from the tube 1202 once the fruit is decelerated by the fruit arrestor 1210. As shown in FIG. 12E, the valve 1220B may be allowed to rotate so that it contains the vacuum in a portion of the tube 1202 toward the end 1206, while cutting off or blocking the vacuum toward the end 1208. Meanwhile, the valve 1220A may be rotated such that it opens, allowing the fruit to fall, e.g., toward a conveyance mechanism or bin handling system. After the fruit exits the tube 1202, both valves 1220A, 1220B are restored to their respective positions shown in FIG. 12A, so that the process may be repeated.

Although FIGS. 12A and 12E illustrate two separate respective controls and actuator units for the valves 1220A, 1220B, in other example implementations one actuator or motor with one cabling mechanism may be configured to control both valves 1220A, 1220B. As an example, the motor 1226B may control a single cable routed between the motor 1226B and the valves 1220A, 1220B. By lowering the tension in that one cable, both valves 1220A, 1220B may open. Conversely, by increasing the tension in the cable, both valves 1220A, 1220B may close.

As such, the configuration shown in FIGS. 12A-12E allows for plucking a fruit and delivering the fruit for further processing. Any of the features discussed above with other end-effectors can be implemented or combined with the end-effector 1200. For example, the end-effector 1200 may also include a mechanism to rotate and twist the fruit as described above with respect to FIGS. 8A-8G. Any of the sensors and controller features discussed above is applicable to the end-effector 1200 as well.

Figure 13A:
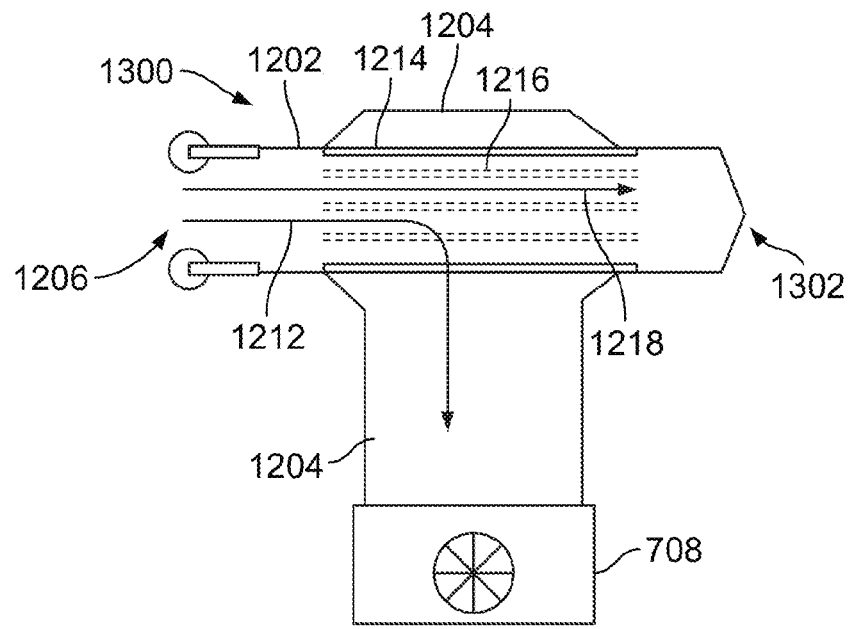
FIG. 13A illustrates an end-effector with another transport mechanism, in accordance with an example implementation.

FIG. 13A illustrates an end-effector 1300 with another transport mechanism, in accordance with an example implementation. The end-effector 1300 is similar to the end-effector 1200 and thus the same reference numbers are used to refer to the same features. However, rather than using the valves 1220A, 1220B and the fruit arrestor 1210 of the end-effector 1200, the end-effector 1300 has a flexible flap mechanism 1302.

Figure 13B:
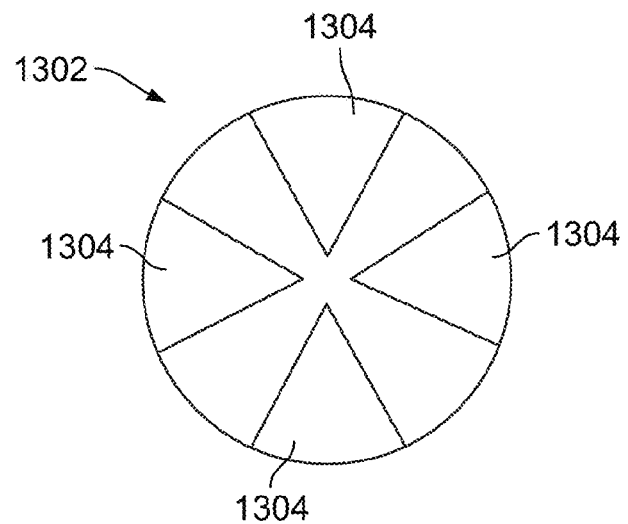
FIG. 13B illustrates a flexible flap mechanism, in accordance with an example implementation.

FIG. 13B illustrates the flexible flap mechanism 1302, in accordance with an example implementation. The flexible flap mechanism 1302 includes multiple flaps 1304. The flaps 1304 may be configured to have a stiffness that is not high enough to damage the fruit, but sufficient to decelerate the fruit and allow the fruit to pass therethrough and out of the tube 1202.

Figure 13C:
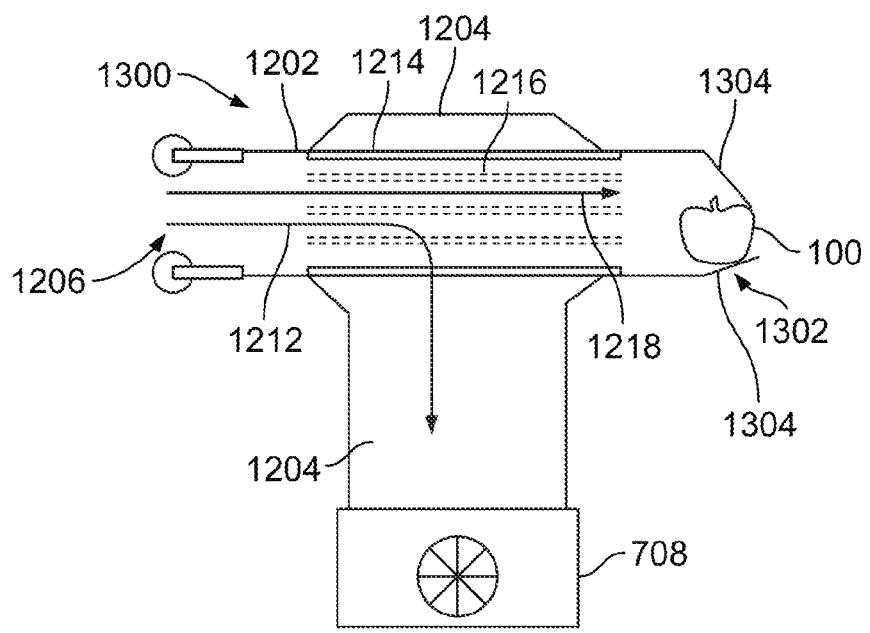
FIG. 13C illustrates an end-effector with flaps opening to let a fruit pass through, in accordance with an example implementation.

FIG. 13C illustrates the end-effector 1300 with the flaps 1304 opening to let the fruit 100 pass through, in accordance with an example implementation. As shown, the momentum of the fruit 100 resulting from the vacuum causes the flaps 1304 to deform or flex and allow the fruit 100 to pass therethrough to a conveyance mechanism or bin handling system (not shown). After the fruit 100 passes through the flexible flap mechanism 1302, and due to the vacuum, the flaps 1304 may restore their position and close such that vacuum dissipation is reduced through the flaps 1304 and the tube 1202 maintains vacuum pressure therein.

In examples, to decelerate the fruit 100, a valve may be placed past the barrel 1214 towards the end 1208. Additionally, another valve could be added toward the end 1206 such that opening the valve at the end 1208 and closing the valve at the end 1206 changes the direction of airflow creating a decelerating force on the fruit 100.

As such, the robotic system 200 may be configured to perform several processes to harvest fruits. The robotic system 200 detects fruits, locates the fruits in 3D space, and generates a map of the fruits in 3D space to generate a plan of a sequence with which the fruits are to be plucked. The robotic system 200 then actuates a robot arm and an end-effector to move to a location of a fruit, and pick the fruit via action of a vacuum system. The robotic system 200 may then remove the fruit from the vacuum environment, decelerate the fruit, and deliver the fruit to a conveyance mechanism that transfers the fruit to a bin handling system.

The processes of removing the fruit from the vacuum environment, decelerating the fruit, and delivering the apple to the conveyance mechanism can be performed in any order. Thus, in one example, the robotic system 200 may first remove the fruit from the vacuum environment, and then decelerate the fruit before the fruit is delivered to the conveyance system. In another example, the fruit may be decelerated while still being in the vacuum environment, and is then removed from the vacuum environment. As such several permutations in the order with which the processes are performed can be implemented.

Figure 14:
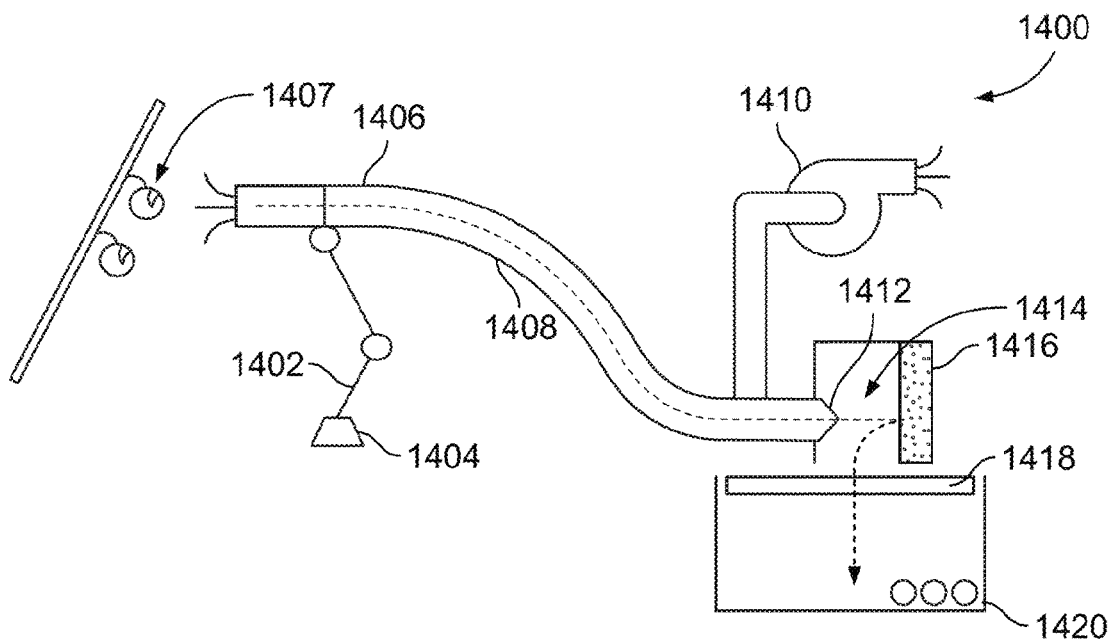
FIG. 14 illustrates a harvesting system with removal of a fruit from a vacuum environment taking place prior to deceleration of the fruit, in accordance with an example implementation.

FIG. 14 illustrates a harvesting device or system 1400 with removal of a fruit from a vacuum environment taking place prior to deceleration of the fruit, in accordance with an example implementation. The harvesting system 1400 includes a robot arm 1402. In FIG. 14, the robot arm 1402 is depicted schematically in a simplified manner, and the robot arm 1402 can be any of the robot arm discussed above (e.g., the robot arms 202A-202F or 500). The robot arm 1400 is coupled to a robotic system 200 or any vehicle at base 1404.

The robot arm 1400 is configured to control position of an end-effector 1406, which could include any of the end-effectors discussed above. The robot arm 1400 may be configured to move the end-effector 1406 in position next to a fruit 1407 (e.g., within a predetermined distance such as 1-5 centimeters from the fruit 1407) on a trellis of a tree. The end-effector 1406 is fluidly coupled to a vacuum generating device or system via a vacuum tube 1408. As an example, the vacuum generating device may include a blower 1410 configured to generate a vacuum in the vacuum tube 1408. The vacuum pulls the fruit 1407 off the tree and causes the fruit 1407 to traverse the length of the vacuum tube 1408.

The harvesting system 1400 may include a check valve-like vacuum-escape or outlet mechanism 1412 that may be similar to the check-valve outlet mechanism 934 or any vacuum-escape outlet mechanism or device described above. As such, the outlet mechanism 1412 may have two flaps or doors located within or at an end of the vacuum tube 1408 and configured to trap or contain the vacuum environment to within the vacuum tube 1408. Once the fruit 1407 passes beyond the doors of the outlet mechanism 1412, the fruit 1407 escapes the vacuum environment existing within the vacuum tube 1408.

A substantially vacuum-free chamber 1414 is disposed past the outlet mechanism 1412, and a deceleration structure 1416 is disposed in the chamber 1414 to decelerate the fruit 1407. The deceleration structure 1416 is represented as a pad in FIG. 14; however, other deceleration structures could be used. For instance, a catch-net similar to the catch-nets 1110A-1110B could be used.

Upon impact with the deceleration structure 1416, the fruit 1407 is slowed down, and gravity causes the fruit to fall onto a bin filler or bin filling mechanism 1418. The bin filling mechanism 1418 could be similar to the bin filler 220, for example. In examples, the bin filling mechanism may include a hinged or pivotable door that is pivoted or rotated open under the weight of the fruit 1407 as the fruit falls onto the pivotable door. The fruit 1407 then falls into a bin 1420. The bin 1420 could represent any of the bins 216A-216C that are disposed on a conveyor and ready to be dropped off the robotic system 200 once the bin 1420 is full. The hinged door of the bin filling mechanism 1418 may then return to its resting position shown in FIG. 14.

With the configuration of FIG. 14, the fruit 1407 is first removed from the vacuum environment generated within the vacuum tube 1408 via the outlet mechanism 1412. Thereafter, the fruit 1407 is decelerated via the deceleration structure 1416.

In FIG. 14, the outlet mechanism 1412 is disposed substantially at a proximal end of the vacuum tube 1408, whereas an entrance or nozzle of the end-effector 1406 is disposed at a distal end of the vacuum tube 1408. With this configuration, the fruit 1407 traverses the length of the vacuum tube 1408 while being subjected to the vacuum pressure therein. As such, the fruit is transferred to the vacuum-escape chamber 1414 while being accelerated via the vacuum pressure within the vacuum tube 1408. In another example implementation, the outlet mechanism 1412 may be located near the distal end of the vacuum tube 1408 immediately after or proximate to the nozzle rather than at the proximal end. For instance, the outlet mechanism 1412 can be integrated within the end-effector 1406. In this example implementation, the fruit 1407 may be removed immediately from the vacuum environment, and gravity and geometry of the vacuum tube 1408, for example, may be used to transfer the fruit 1407 to the deceleration structure 1416 and the bin filling mechanism 1418. In this manner, the speed with which the fruit 1407 is transferred to the deceleration structure 1416 may be reduced.

Figure 15A:
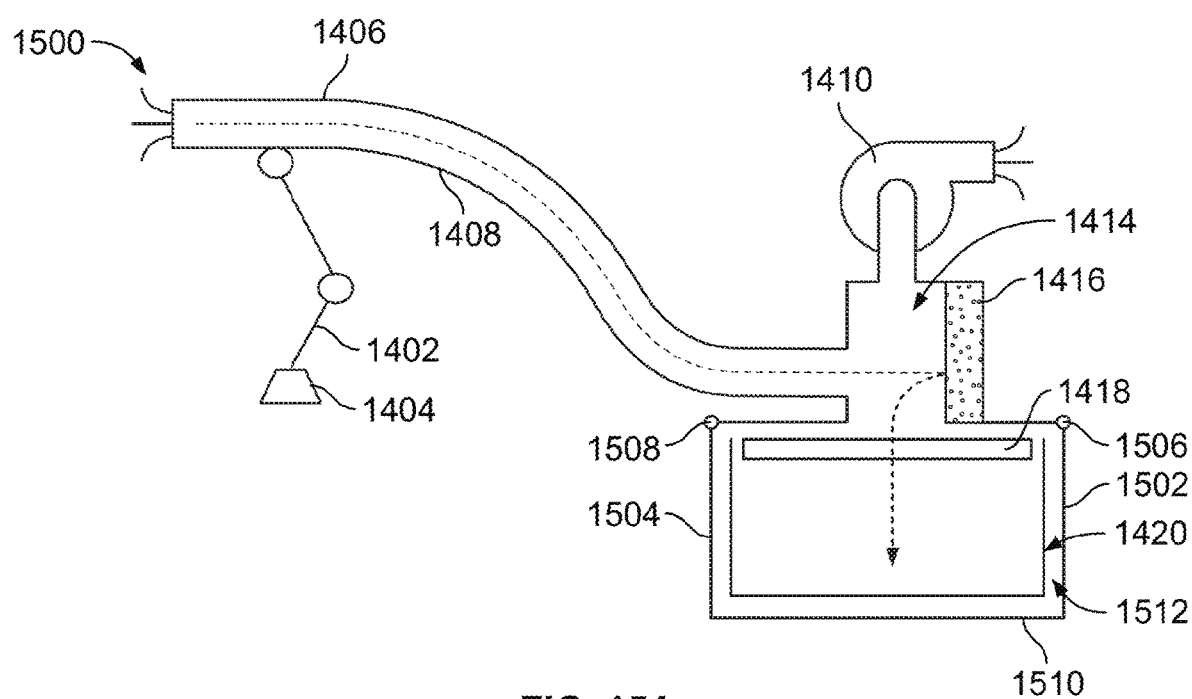
FIG. 15A illustrates harvesting system with removal of a fruit from a vacuum environment taking place after deceleration of the fruit, in accordance with an example implementation.

In other example implementations, the fruit 1407 may first be decelerated, then conveyed to the bin 1420, and thereafter removed from the vacuum environment. FIG. 15A illustrates a harvesting device or system 1500 with removal of a fruit from a vacuum environment taking place after deceleration of the fruit, in accordance with an example implementation. The same components from the harvesting system 1400 that are used with the harvesting system 1500 are referred to with the same reference numbers.

As shown in FIG. 15A, the harvesting system 1500 does not include the outlet mechanism 1412 disposed at the proximal end of the vacuum tube 1408. The harvesting system 1500 includes a first door 1502 and a second door 1504. The doors 1502 and 1504 are coupled to the harvesting system 1500 (e.g., coupled to the structure that includes the vacuum tube 1408, the chamber 1414, and the deceleration structure 1416). Specifically, the door 1502 is rotatably coupled to the harvesting system 1500 via a pivot 1506, and the second door 1504 is rotatably coupled to the harvesting system 1500 via a pivot 1508. The bin 1420 rests on a conveyor 1510 that may be a part of the bin handling mechanism or system.

The pivots 1506, 1508 allow the doors 1502, 1504 to toggle between a closed position and an open position. In the state shown in FIG. 15A, the doors 1502, 1504 are closed and along with the conveyor 1510 form a chamber 1512 that contains the bin 1420. With this configuration, the chamber 1512 is disposed in the vacuum environment. As such, the fruit remains in the vacuum environment while being plucked, transferred to the chamber 1414, decelerated via the deceleration structure 1416, and delivered to the bin 1420 via the bin filling mechanism 1418. The doors 1502, 1504 are configured to seal the vacuum environment such that the bin 1420 is included within the vacuum environment.

Figure 15B:
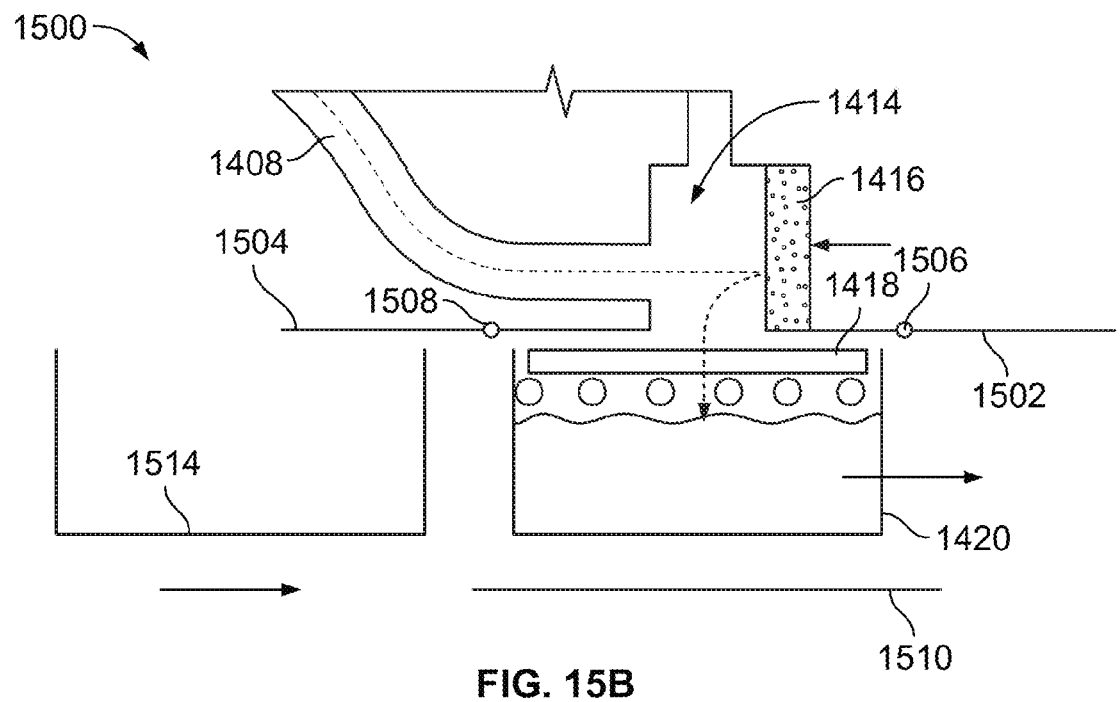
FIG. 15B illustrates moving a bin out of a vacuum environment, in accordance with an example implementation.

Once the bin 1420 is full of fruits, it is moved via the conveyor 1510 to allow an empty bin to replace it. FIG. 15B illustrates moving the bin out of the vacuum environment, in accordance with an example implementation. Once the controller (e.g., the controller 402) of the harvesting system 1500 determines via sensors that the bin 1420 is full, the controller may send a command to open the doors 1502, 1504.

For example, the pivots 1506 and 1508 may include motors that, once commanded, rotate the doors 1502, 1504 to the position shown in FIG. 15B. As the doors 1502, 1504 toggle to an open position, the vacuum environment is no longer sealed. The controller then sends a command to activate the conveyor 1510 to move the bin 1420 (e.g., to the right in FIG. 15B) to allow a subsequent empty bin 1514 to replace the bin 1420. The controller then commands the doors 1502, 1504 to re-close and re-seal the vacuum environment as described with respect to FIG. 15A to allow the bin 1514 to be filled.

In another example, the doors 1502, 1504 may be opened and closed passively. For instance, movement of the conveyor 1510 may force the door 1502 to open against a spring force of a spring coupled to the hinge 1506. The door 1502 may be connected to the door 1504 via a string or cable, such that when the door 1502 opens, the door 1504 is pulled upward to open as well. Once the bin 1420 is moved past the door 1502, the door 1502 is restored back into position by the spring force to re-seal the vacuum environment. Other configurations are possible. With the configuration of FIGS. 15A-15B, the fruit is decelerated first and thereafter, when the bin 1420 is full, the vacuum environment is unsealed to allow the bin 1420 and the fruits therein to escape the vacuum environment.

In examples, using a high-power vacuum that generates a large suction power may be beneficial as the large suction force may be sufficient to pluck the fruit from the tree. For example, the blower 1410 described above may be a high-power vacuum blower. However, transferring or conveying the fruit through the vacuum tube (e.g., the vacuum tube 1408) using the high-power vacuum blower may cause the fruit to be accelerated to large velocities, and may thus cause the fruit to be bruised or damaged. Thus, in some example implementations, two levels of vacuum power may be used.

Figure 16:
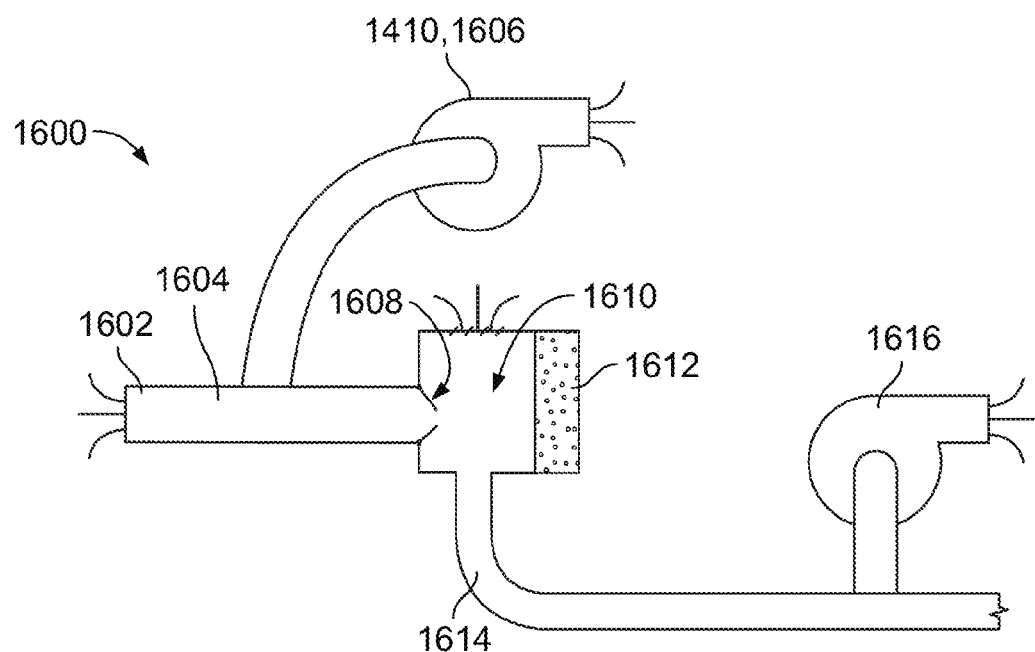
FIG. 16 illustrates a schematic diagram of a harvesting system having two levels of vacuum power, in accordance with an example implementation.

FIG. 16 illustrates a schematic diagram of a harvesting device or system 1600 having two levels of vacuum power, in accordance with an example implementation. Similar to the harvesting system 1400, the harvesting system 1600 includes an end-effector 1602 fluidly coupled to a vacuum generating device via a vacuum tube 1604. The vacuum generating device may include a vacuum blower 1606 that may be a high-power vacuum-generating blower to facilitate putting a fruit off a tree.

The fruit traverses the length of the vacuum tube 1604, which may be short, and opens a check valve-like vacuum-escape or outlet mechanism 1608 that may be similar to the check-valve mechanisms 1412 and 934 described above. Once the fruit passes beyond the doors of the mechanism 1608, the fruit escapes the vacuum environment existing within the vacuum tube 1604 into a substantially vacuum-free chamber 1610. A deceleration structure 1612 disposed in the chamber 1610 is configured to decelerate the fruit.

In contrast to the harvesting system 1400, upon impact with the deceleration structure 1612, the fruit is not then delivered directly to a bin filler or bin filling mechanism. Rather, the fruit falls onto a second vacuum tube 1614 coupled to the chamber 1610. Vacuum pressure is generated in the second vacuum tube 1614 by a low-power blower 1616. The vacuum tube 1614 is used to convey the fruit to a bin filling mechanism (not shown).

The vacuum tube 1604 may be made shorter than the vacuum tube 1614, and as such, the fruit remains in a high-power vacuum environment for a short amount of time to preclude damage thereto, before being transferred to a lower-power vacuum environment used to convey the fruit to the bin filling mechanism. Thus, with this configuration, the blowers 1606 and 1616 are tuned to have different power levels, with the blower 1606 tuned to have a higher power sufficient for plucking the fruit, and the blower 1616 with a lower power sufficient to convey the fruit to the bin filling mechanism. For example, the different power levels could indicate that the blower 1616 has lower suction power, lower air flow rate, lower electric power (e.g., lower wattage, current, or voltage) driving a motor of the blower 1616 compared to a motor of the blower 1606, lower vacuum pressure, etc. As a specific example, the blower 1616 could have a suction power of 5 horsepower (hp), cause a vacuum pressure of 2 inch mercury (in Hg), and induce an airflow of 80 cubic foot per minute (CFM); whereas the blower 1606 may have a suction power of 30 hp, cause a vacuum pressure of 16 in Hg, and cause an airflow of 100 CFM. These numbers are examples for illustration only.

Figure 17A:
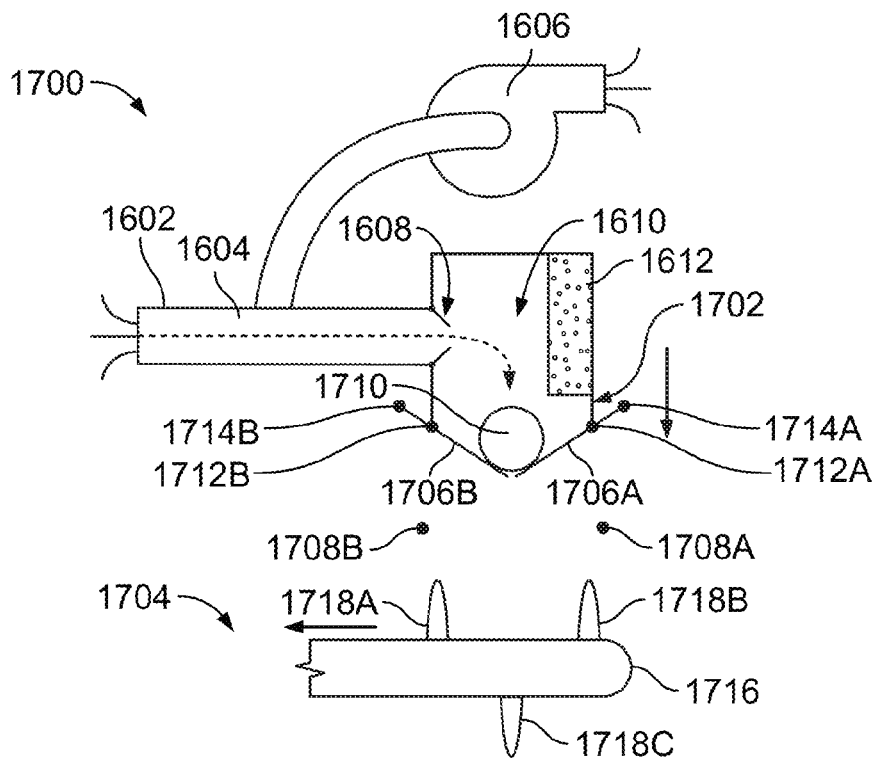
FIG. 17A illustrates a harvesting system with a dispensing mechanism and a conveyance mechanism, in accordance with an example implementation.

FIG. 17A illustrates a harvesting device or system 1700 with a dispensing mechanism 1702 and a conveyance device or mechanism 1704, in accordance with an example implementation. The harvesting system 1700 may have the end-effector 1602, the vacuum tube 1604, the blower 1410 or 1606, the outlet mechanism 1608, the chamber 1610, and the deceleration structure 1612 that operate as described above. Additionally, the harvesting system 1700 has the dispensing mechanism 1702 that includes flaps 1706A, 1706B. The flaps 1706A, 1706B cooperate with pegs 1708A, 1708B to dispense fruits to the conveyance mechanism 1704 as described below.

A fruit 1710 is plucked and transferred via the vacuum tube 1604 past the outlet mechanism 1612, to be decelerated by the deceleration 1612 as described above. The fruit 1710 then falls down by gravity onto the flaps 1706A-1706B that hold the fruit 1710 in the position shown in FIG. 17A. The flaps 1706A-1706B may be coupled to the harvesting system 1700 via respective hinges 1712A, 1712B. The flaps 1706A-1706B may be spring-loaded, for example, at the respective hinges 1712A, 1712B to maintain the flaps 1706A-1706B at the closed position shown in FIG. 17A.

The harvesting system 1700 may be included in a robot arm such as any of the robot arms described above (e.g., the robot arms 202A-202F or 500). After plucking the fruit 1710, the controller of the robotic system 200 and the robot arm commands the robot arm along with the harvesting system 1700 to be positioned as shown in FIG. 17A relative to the pegs 1708A, 1708B. The controller then commands the harvesting system to move downward to cause a dispensing event.

Particularly, as illustrated in FIG. 17A, the harvesting system 1700 is positioned such that as it moves downward, the peg 1708A contacts the flap 1706A between the hinge 1712A and a tip 1714A of the flap 1706A. Similarly, as the harvesting system 1700 moves downward, the peg 1708B contacts the flap 1706B between the hinge 1712B and a tip 1714B of the flap 1706B.

Figure 17B:
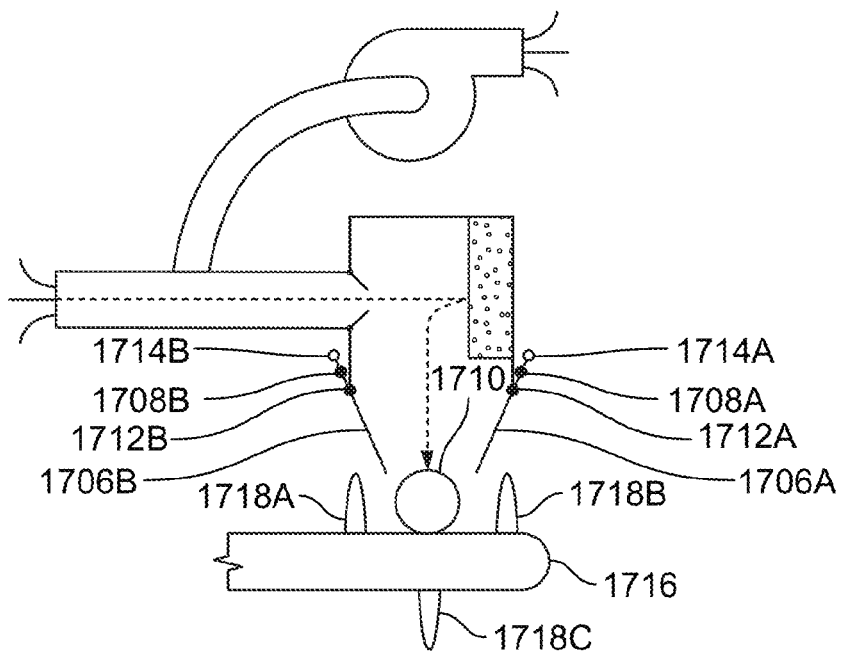
FIG. 17B illustrates the harvesting system shown in FIG. 17A after moving downward, in accordance with an example implementation.

FIG. 17B illustrates the harvesting system 1700 after moving downward, in accordance with an example implementation. As depicted in FIG. 17B, as the harvesting system 1700 moves downward, the pegs 1708A, 1708B operate as pivots about which the flaps 1706A, 1706B rotate to release the fruit 1710 onto the conveyance mechanism 1704.

The conveyance mechanism 1704 may include a conveyor belt 1716 disposed on which are a plurality of posts or cleats, such as cleats 1718A, 1718B, and 1718C. More cleats could be disposed on and coupled to the conveyor belt 1716. The space between each pair of cleats form a respective pocket configured to receive a dispensed fruit. For example, as depicted in FIG. 17B, as the flaps 1706A, 1706B open, the fruit 1710 is released and deposited between the cleats 1718A and 1718B. The conveyor belt 1716 then transfers the fruit 1710 to a bin filler mechanism or directly to a bin. The process may then be repeated where a fruit is plucked by the harvesting system 1700, which then moves downward again to dispense the fruit onto a pocket formed between cleats of the belt 1716.

The cleats 1718A-1718C divide the conveyor belt 1716 into distinct pockets to preclude interaction between different fruits and reduce the likelihood of damaging or bruising the fruits. However, in some examples, the harvesting system 1700 may include a flat belt without cleats, and the belt may be padded to absorb the kinetic energy of a falling fruit without causing damage thereto.

In some examples, the belt 1716 may be configured to move intermittently. For instance, the belt 1716 moves so as to align an empty pocket between two cleats with the dispensing mechanism 1702, and then after a fruit is dispensed, the belt 1716 moves again to align a subsequent pocket with the dispensing mechanism 1702. Such stop-and-go configuration may slow down the harvesting process, and it may be desirable in some cases to cause the belt to move continuously.

Figure 18A:
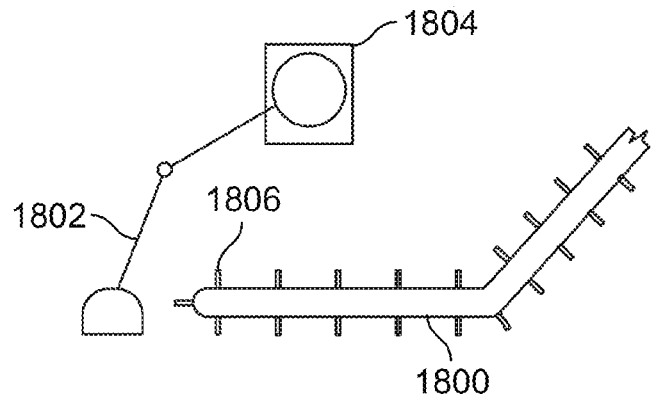
FIG. 18A illustrates a continuously-moving belt and a robotic arm configured to place fruits onto the continuously-moving belt, in accordance with an example implementation.

FIG. 18A illustrates a continuously-moving belt 1800 and robot arm 1802 configured to place fruits onto the continuously-moving belt 1800, in accordance with an example implementation. The robot arm 1802 may include an end-effector or harvesting system having a holding or dispensing mechanism 1804. The continuously-moving belt 1800 may have a plurality of cleats, such as cleat 1806, disposed thereon.

Figure 18B:
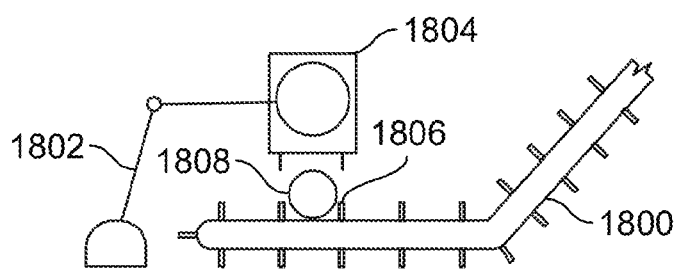
FIG. 18B illustrates depositing a fruit on a continuously-moving belt at a first position, in accordance with an example implementation.
Figure 18C:
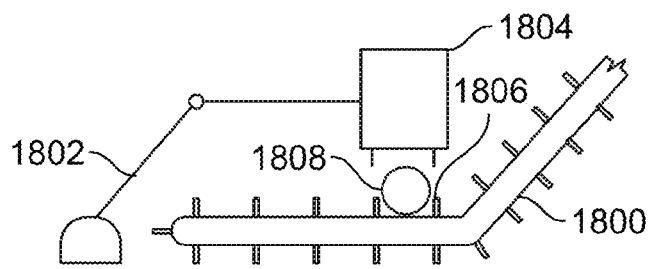
FIG. 18C illustrates depositing a fruit on a continuously-moving belt at a second position, in accordance with an example implementation.

Because the continuously-moving belt 1800 does not stop at a position aligned with the dispensing mechanism 1804, the robot arm 1802 is configured to move and reach out multiple pockets formed between the cleats of the continuously-moving belt 1800. For example, FIG. 18B illustrates depositing a fruit 1808 on the continuously-moving belt 1800 at a first position, and FIG. 18C illustrates depositing the fruit 1808 on the continuously-moving belt 1800 at a second position, in accordance with an example implementation. As shown in FIG. 18B, compared to FIG. 18A, the cleat 1806 has moved as the continuously-moving belt 1800 moves. To deposit the fruit 1808 at a pocket formed by the cleat 1806 and a neighboring cleat, the robot arm 1802 moves to the position shown in FIG. 18B to dispense the fruit 1808.

Alternatively, as shown in FIG. 18C, the cleat 1806 has moved further as the continuously-moving belt 1800 moves. To deposit the fruit 1808 at a pocket formed by the cleat 1808 and the neighboring cleat, the robot arm 1802 moves further to the position shown in FIG. 18C to dispense the fruit 1808. As such, the robot arm 1802 is movable to reach a broad range of positions on the continuously-moving belt 1800. With this configuration, harvesting may be more efficient as the robot arm 1802 is configured to reach multiple positions to deposit the fruit, thus allowing the belt 1800 to be continuously-moving, as opposed to intermittently-moving.

Further, with this configuration, the likelihood of damaging or bruising the fruit is reduced. Particularly, the robot arm 1802 may be configured to identify, e.g., via vision sensors coupled to the end-effector, an empty pocket on the belt 1800. The robot arm 1802 may then move to align the dispensing mechanism 1804 with the position of the empty pocket. Throughout the dispense event, the robot arm 1802 may move the end-effector and the dispensing mechanism 1804 coupled thereto at a speed that substantially matches the speed of the belt 1800 to reduce relative speed therebetween. As such, the likelihood of placing the fruit in the identified pocket without dropping the fruit on the tip of a cleat, increases, and thus the likelihood of bruising the fruit due to contact with the cleats may be reduced.

In addition to reducing the likelihood of bruising the fruit by matching the speed of the dispensing mechanism 1804 to the speed of the belt 1800, the cleats and the belt 1800 may be padded to preclude damage or bruising to the fruit upon any contact between the fruit and the belt 1800 or its cleats.

Figure 19A:
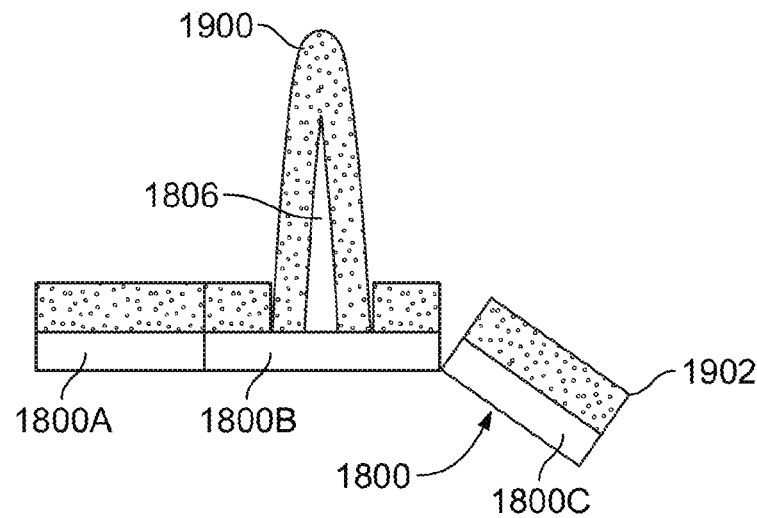
FIG. 19A illustrates lining a cleat and a belt with padding, in accordance with an example implementation.
Figure 19B:
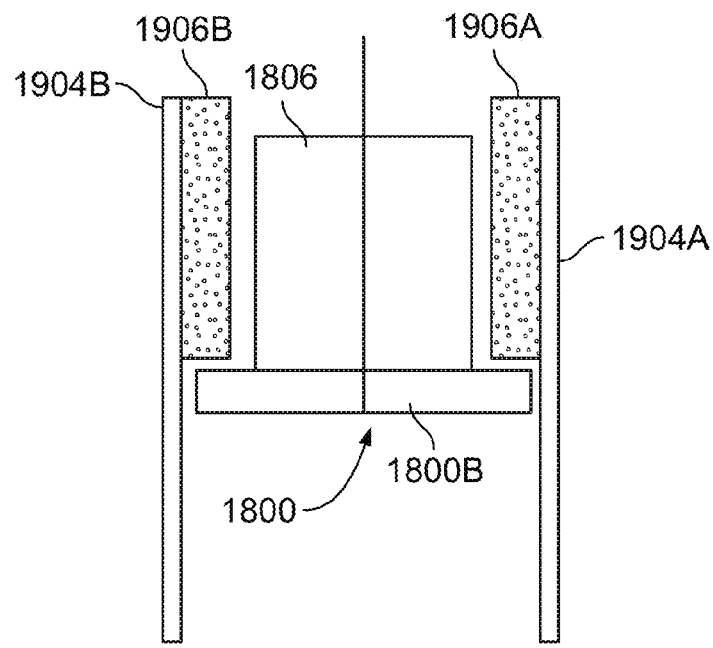
FIG. 19B illustrates a cross sectional view of a belt and a cleat, in accordance with an example implementation.

FIG. 19A illustrates lining the cleat 1806 and the belt 1800 with padding, and FIG. 19B illustrates a cross-sectional view of the belt 1800 and the cleat 1806, in accordance with an example implementation. As shown in FIG. 19A, the cleat 1806 may have a padding layer 1900. The padding layer 1900 may be made of, for example, open cell foam or any other similar soft material that absorbs kinetic energy of a falling fruit without bruising the fruit. In examples, the padding layer 1900 may be covered with another layer of silicon or urethane or any type of rubber coating to reduce wear to the cleats.

Further, the belt 1800 may be made of multiple links, such as links 1800A, 1800B, and 1800C. The links 1800A-1800C could be made of a plastic material, for example. The links 1800A-1800C could also be covered with respective padding layers. For instance, the link 1800C could be covered with a padding layer 1902 that, similar to the padding layer 1900, could be made of, for example, open cell foam or any other similar soft material that absorbs kinetic energy of a falling fruit without bruising the fruit. The padding layer 1902 may also be covered with another layer of a silicon, urethane, or any type of rubber coating to reduce wear to the link 1800C. The other links of the belt 1800 are also configure to be covered with respective padding layers similar to the padding layer 1902.

As such, a fruit that is falling at a particular speed, e.g., 10 meter per second, may be protected from damage or bruising upon impacting the cleat 1806 or the belt 1800. As a further protection to the fruit, as shown in FIG. 19B, the belt 1800 may have side walls 1904A and 1904B that guide the fruit and maintain the fruit on the belt 1800 as the belt 1800 moves. The side walls 1904A-1904B could also be padded with respective padding layers 1906A, 1906B. The padding layers 1906A, 1906B could be similar to the padding layers 1900 and 1902. With this configuration, the fruit is enveloped from all sides by padding layers for protection against damage or bruising.

Figure 20:
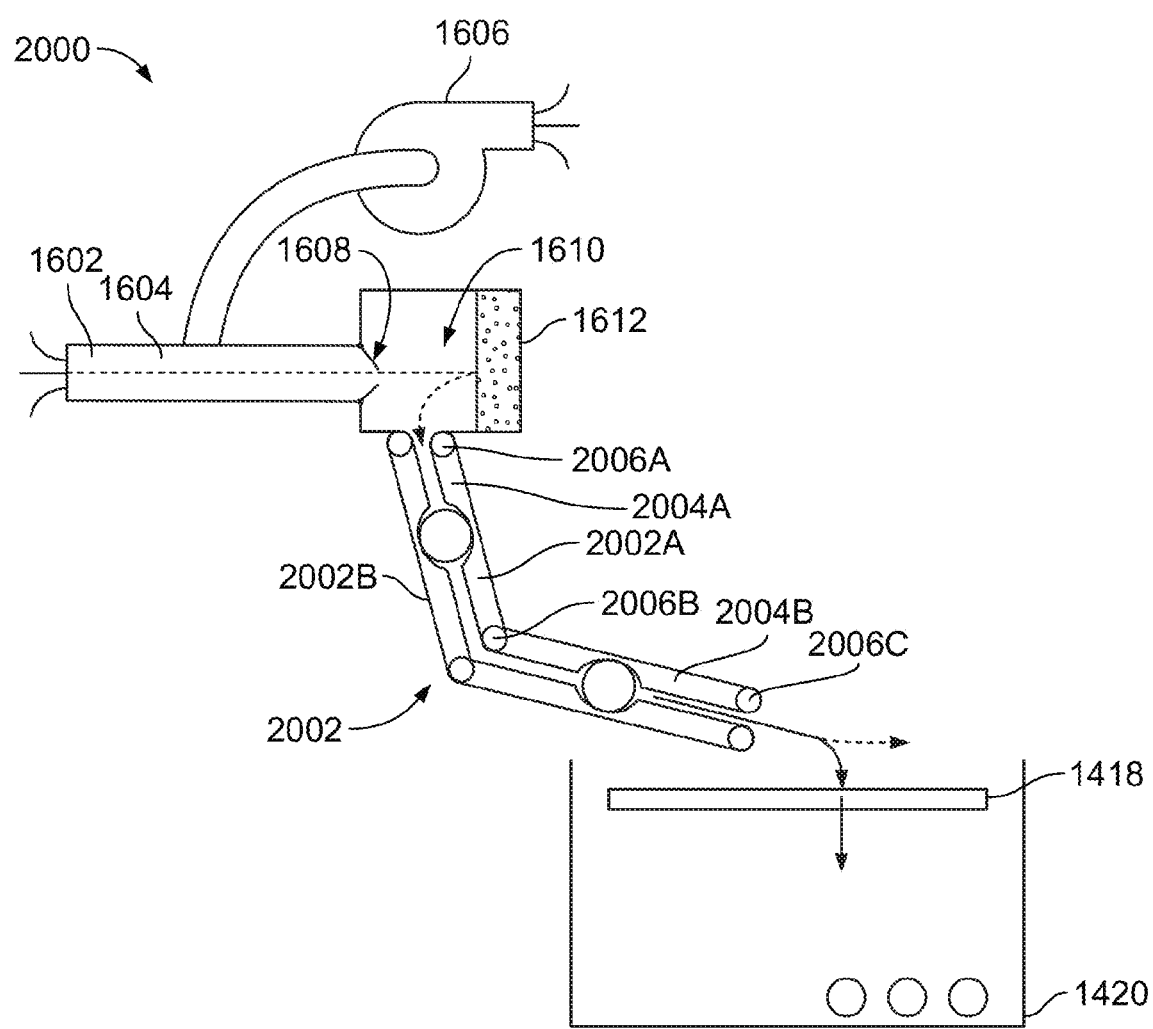
FIG. 20 illustrates a harvesting system with a conveyance device having a sandwiching belt, in accordance with an example implementation.

FIG. 20 illustrates a harvesting device or system 2000 with a conveyance mechanism or device having a sandwiching belt 2002, in accordance with an example implementation. The harvesting system 2000 may have the end-effector 1602, the vacuum tube 1604, the blower 1410 or 1606, the outlet mechanism 1608, the chamber 1610, the deceleration structure 1612, the bin filling mechanism 1418, and the bin 1420 that operate as described above.

Additionally, the harvesting system 2000 may include the sandwiching belt 2002 configured to transfer the plucked fruit to the bin filling mechanism 1418. The sandwiching belt 2002 may include two parallel moving belts 2002A and 2002B. Each of the belt 2002A, 2002B may include multiple links and may be configured to rotate about rollers. For instance, the belt 2002A includes links 2004A, 2004B and is configured to rotate about rollers 2006A, 2006B, and 2006C.

As an example, the rollers 2006A-2006B may include sprockets disposed at hinges between the links 2004A, 2004B. Motors coupled to the rollers 2006A-2006C may be configured to cause the belt 2002A to rotate about the rollers 2006A-2006C, thus advancing the belt 2002A. The hinges at which the rollers 2006A-2006C are disposed allow relative rotation and flexibility between the links 2004A and 20048. The belt 2002B may be configured similar to the belt 2002A as well.

As the fruit decelerates at the deceleration structure 1612, it falls into a space between the two belts 2002A, 2002B. The belts 2002A, 2002B may be made from a stretchy or elastic material such as spandex, for example. Each of the belts 2002A, 2002B may stretch to accommodate one side of the fruit. The belts 2002A, 2002B thus envelop the fruit and may preclude relative linear motion (e.g., fruit slippage) between the belts 2002A, 2002B and the fruit.

The end-effector 1602 may then move rapidly to the location of a next fruit, and the sandwiching belt 2002 precludes the plucked fruit from being ejected as a result of rapid movements of the end-effector 1602. As the belts 2002A, 2002B are advanced, the fruit is transported to the bin filling mechanism 1418, or in some examples, directly to the bin 1420.

One advantage of the configuration shown in FIG. 20 is that the end-effector 1602 can be moved directly to the next fruit to be plucked without being involved in the conveyance process. For instance, in contrast to the configuration in FIGS. 17A-17B, the end-effector 1602 does not move downward to cause a dispensing event. Also, in contrast to the configuration of FIGS. 18A-18C, the end-effector 1602 does not match the speed of the belt 1800 to align a dispensing mechanism with the bin 1420. Rather, the sandwiching belt 2002 is configured to convey the fruit to the bin 1420, and as such, the conveyance process is decoupled from the plucking process. This configuration of FIG. 20 may thus lead to a more efficient harvesting system. Further, with the configuration of FIG. 20, the vacuum system is not used to transport the fruit to the bin 1420, thus reducing the likelihood of bruising the fruit.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A fruit harvesting robotic system comprising:
a vacuum generating device;
a harvesting device comprising:
   an end-effector having an inlet,
   a vacuum tube coupled to the inlet of the end-effector and to the vacuum generating device, wherein the vacuum generating device is configured to generate a vacuum environment in the vacuum tube, and wherein the inlet of the end-effector has a size that allows fruit of a particular type to pass through the inlet and enter the vacuum environment in the vacuum tube,
   an outlet mechanism coupled to the vacuum tube, wherein fruit that has entered the vacuum environment is able to exit the vacuum environment through the outlet mechanism,
   wherein the outlet mechanism comprises two spring-loaded doors located within or at an end of the vacuum tube, wherein the two spring-loaded doors open to allow the fruit to pass through an opening formed between the two spring-loaded doors as the fruit impacts the two spring-loaded doors due to momentum of the fruit caused by the vacuum environment, and wherein the two spring-loaded doors close after the fruit passes therethrough to contain the vacuum environment within the vacuum tube, and
   a deceleration structure configured to decelerate fruit that has traversed at least a portion of the vacuum environment without damaging fruit; and
a robotic arm connected to the harvesting device, the robotic arm configured to move the harvesting device to position the inlet of the end-effector within a predetermined distance from a fruit attached to a tree, wherein the vacuum environment generates an airflow through the inlet, thereby inducing a force to be applied to the fruit, pulling the fruit through the inlet into the vacuum tube and separating the fruit from the tree.

2. The fruit harvesting robotic system of claim 1, wherein the deceleration structure is disposed outside of the vacuum environment and configured to decelerate fruit that has exited the vacuum environment through the outlet mechanism.

3. The fruit harvesting robotic system of claim 1, further comprising:
a bin filling mechanism comprising a pivotable door configured to rotate about a pivot; and
a bin positioned underneath the pivotable door, wherein the pivotable door is disposed below the deceleration structure such that fruit falls onto the pivotable door after being decelerated by the deceleration structure, thereby causing the pivotable door to rotate about the pivot and allowing the fruit to enter the bin.

4. A fruit harvesting robotic system comprising:
a vacuum generating device;
a harvesting device comprising:
   an end-effector having an inlet,
   a vacuum tube coupled to the inlet of the end-effector and to the vacuum generating device, wherein the vacuum generating device is configured to generate a vacuum environment in the vacuum tube, and wherein the inlet of the end-effector has a size that allows fruit of a particular type to pass through the inlet and enter the vacuum environment in the vacuum tube,
   an outlet mechanism coupled to the vacuum tube, wherein fruit that has entered the vacuum environment is able to exit the vacuum environment through the outlet mechanism, and
   a deceleration structure configured to decelerate fruit that has traversed at least a portion of the vacuum environment without damaging fruit;
a bin filling mechanism comprising a pivotable door configured to rotate about a pivot;
a bin positioned underneath the pivotable door, wherein the pivotable door is disposed below the deceleration structure such that fruit falls onto the pivotable door after being decelerated by the deceleration structure, thereby causing the pivotable door to rotate about the pivot and allowing the fruit to enter the bin; and
a robotic arm connected to the harvesting device, the robotic arm configured to move the harvesting device to position the inlet of the end-effector within a predetermined distance from a fruit attached to a tree, wherein the vacuum environment generates an airflow through the inlet, thereby inducing a force to be applied to the fruit, pulling the fruit through the inlet into the vacuum tube and separating the fruit from the tree,
wherein the deceleration structure is disposed within the vacuum environment, and wherein the outlet mechanism comprises (i) a first door coupled to the harvesting device at a first pivot, and (ii) a second door coupled to the harvesting device at a second pivot, wherein the first pivot and the second pivot allow the first door and the second door, respectively, to toggle between a closed position and an open position, and wherein:
when the first door and the second door are in the closed position, the first door and the second door form a chamber containing the bin, such that the bin is disposed within the vacuum environment, and
when the first door and the second door are in the open position, the bin is able to exit the vacuum environment.

5. The fruit harvesting robotic system of claim 4, further comprising:
a conveyor upon which the bin is disposed; and
a controller configured to perform operations comprising:
   determining that the bin is full;
   causing the first door and the second door to open;
   activating the conveyor to transfer the bin out of the vacuum environment and position a subsequent bin underneath the bin filling mechanism; and
   causing the first door and the second door to close so as to re-seal the vacuum environment around the subsequent bin.

6. The fruit harvesting robotic system of claim 1, wherein the vacuum tube is a first vacuum tube, wherein the vacuum generating device comprises a first vacuum blower configured to generate the vacuum environment in the first vacuum tube, and wherein the fruit harvesting robotic system further comprises:
- a second vacuum tube coupled to the harvesting device; and
- a second vacuum blower configured to generate a second vacuum environment in the second vacuum tube to transport the fruit from the first vacuum tube through the second vacuum tube to a bin.

7. The fruit harvesting robotic system of claim 6, wherein the second vacuum tube is coupled to the harvesting device such that fruit that exits the vacuum environment through the outlet mechanism thereafter enters the second vacuum tube.

8. A fruit harvesting robotic system comprising:
- a first vacuum generating device;
- a harvesting device comprising:
  - an end-effector having an inlet,
  - a first vacuum tube coupled to the inlet of the end-effector and to the first vacuum generating device, wherein the first vacuum generating device is configured to generate a first vacuum environment in the first vacuum tube, and wherein the inlet of the end-effector has a size that allows fruit of a particular type to pass through the inlet and enter the first vacuum environment in the first vacuum tube,
  - an outlet mechanism coupled to the first vacuum tube, wherein fruit that has entered the first vacuum environment is able to exit the first vacuum environment through the outlet mechanism, and
  - a deceleration structure configured to decelerate fruit that has traversed at least a portion of the first vacuum environment without damaging fruit;
- a second vacuum tube coupled to the harvesting device such that fruit that exits the first vacuum environment through the outlet mechanism thereafter enters the second vacuum tube;
- a second vacuum blower configured to generate a second vacuum environment in the second vacuum tube to transport the fruit from the first vacuum tube through the second vacuum tube to a bin,
- wherein the fruit enters the second vacuum tube after being decelerated by the deceleration structure; and
- a robotic arm connected to the harvesting device, the robotic arm configured to move the harvesting device to position the inlet of the end-effector within a predetermined distance from a fruit attached to a tree, wherein the first vacuum environment generates an airflow through the inlet, thereby inducing a force to be applied to the fruit, pulling the fruit through the inlet into the first vacuum tube and separating the fruit from the tree.

9. The fruit harvesting robotic system of claim 6, wherein the second vacuum blower has a different suction power compared to the first vacuum blower.

10. The fruit harvesting robotic system of claim 9, wherein the second vacuum blower has a lower suction power compared to the first vacuum blower.

11. A fruit harvesting robotic system comprising:
- a vacuum generating device;
- a harvesting device comprising:
  - an end-effector having an inlet,
  - a vacuum tube coupled to the inlet of the end-effector and to the vacuum generating device, wherein the vacuum generating device is configured to generate a vacuum environment in the vacuum tube, and wherein the inlet of the end-effector has a size that allows fruit of a particular type to pass through the inlet and enter the vacuum environment in the vacuum tube,
  - an outlet mechanism coupled to the vacuum tube, wherein fruit that has entered the vacuum environment is able to exit the vacuum environment through the outlet mechanism, and
  - a deceleration structure configured to decelerate fruit that has traversed at least a portion of the vacuum environment without damaging fruit;
- a robotic arm connected to the harvesting device, the robotic arm configured to move the harvesting device to position the inlet of the end-effector within a predetermined distance from a fruit attached to a tree, wherein the vacuum environment generates an airflow through the inlet, thereby inducing a force to be applied to the fruit, pulling the fruit through the inlet into the vacuum tube and separating the fruit from the tree;
- a dispensing mechanism comprising (i) a first flap coupled to the harvesting device via a first pivot, and (ii) a second flap coupled to the harvesting device via a second pivot, wherein the dispensing mechanism is disposed below the deceleration structure such that fruit that is decelerated by the deceleration structure falls onto and is held by the first and second flaps; and
- a controller configured to perform further operations comprising:
  - moving the harvesting device toward a first peg and a second peg such that the first peg is aligned between the first pivot and a tip of the first flap, and the second peg is aligned between the second pivot and a respective tip of the second flap, wherein as the first flap and the second flap respectively contact the first peg and the second peg, the first flap pivots around the first pivot and the second flap pivots around the second pivot, thereby dispensing the fruit from the harvesting device.

12. The fruit harvesting robotic system of claim 1, further comprising:
- a conveyor belt configured to receive fruit that has passed through the harvesting device, wherein the conveyor belt comprises a plurality of cleats disposed thereon, wherein each pair of cleats form a pocket therebetween configured to receive at least one fruit that has passed through the harvesting device.

13. The fruit harvesting robotic system of claim 12, further comprising a controller configured to perform operations comprising:
- identifying an empty pocket formed between two cleats of the plurality of cleats; and
- causing the robotic arm to move the end-effector at a speed that substantially matches a respective speed of the conveyor belt, such that an individual fruit passes through the harvesting device and is received onto the identified empty pocket.

14. The fruit harvesting robotic system of claim 12, wherein cleats of the plurality of cleats are covered with respective padding layers made of a visco-elastic material.

15. The fruit harvesting robotic system of claim 12, wherein the conveyor belt is made of a series of links, each link having disposed thereon a respective padding layer made of a visco-elastic material.

16. The fruit harvesting robotic system of claim 1, further comprising:

a conveyance device coupled to the harvesting device and configured to convey fruit that passes through the harvesting device to a bin, wherein the conveyance device comprises:
  a first conveyor belt; and
  a second conveyor belt parallel to the first conveyor belt, such that the first conveyor belt and the second conveyor belt sandwich the fruit that passes through the harvesting device.

17. The fruit harvesting robotic system of claim 16, wherein each of the first conveyor and the second conveyor belt comprises a plurality of links, wherein the conveyance device further comprises:
  a plurality of hinges disposed between respective links of the plurality of links, wherein respective rollers are disposed at the plurality of hinges to advance the first and second conveyor belts.

18. The fruit harvesting robotic system of claim 17, wherein a first link and a second link of the plurality of links are coupled to each other at a hinge such that the hinge allows for relative rotation between the first link and the second link about the hinge.

19. The fruit harvesting robotic system of claim 18, wherein the first conveyor belt and the second conveyor belt are made of an elastic material and are configured to envelop and reduce slippage of the conveyed fruit.

20. The fruit harvesting robotic system of claim 8, wherein the second vacuum blower has a lower suction power compared to the first vacuum blower.

\* \* \* \* \*